US012766418B2

(12) United States Patent
Ichiraku

(10) Patent No.: US 12,766,418 B2
(45) Date of Patent: Oct. 20, 2026

(54) STORAGE MEDIUM, GAME CONTROL METHOD, AND GAME SYSTEM FOR WHICH A MISSION IS PROGRESSED IN SOLO-PLAY AND MULTI-PLAY OF A VIRTUAL GAME

(71) Applicants: NINTENDO CO., LTD., Kyoto (JP); The Pokémon Company, Tokyo (JP)

(72) Inventor: Katsuhiko Ichiraku, Tokyo (JP)

(73) Assignees: NINTENDO CO., LTD., Kyoto (JP); THE POKEMON COMPANY, Tokyo (JP)

( * ) Notice: Subject to any disclaimer, the term of this patent is extended or adjusted under 35 U.S.C. 154(b) by 217 days.

(21) Appl. No.: 18/647,905

(22) Filed: Apr. 26, 2024

(65) Prior Publication Data

US 2025/0128174 A1 Apr. 24, 2025

(30) Foreign Application Priority Data

Oct. 18, 2023 (JP) ................................ 2023-179669

(51) Int. Cl.
*A63F 13/69* (2014.01)

(52) U.S. Cl.
CPC .................................... *A63F 13/69* (2014.09)

(58) Field of Classification Search
CPC .......... A63F 13/47; A63F 13/50; A63F 13/69; A63F 13/79; A63F 13/795; A63F 13/822; A63F 13/847; A63F 2300/807; A63F 2300/5546
See application file for complete search history.

(56) References Cited

FOREIGN PATENT DOCUMENTS

| | | | | |
|---|---|---|---|---|
| JP | 2002239237 A | | 8/2002 | |
| JP | WO2013099349 | * | 7/2013 | ............ A63F 13/12 |
| JP | 2015-136552 | | 7/2015 | |
| JP | 2020-006245 | | 1/2020 | |
| JP | 2023-096043 | | 7/2023 | |
| JP | 2023-117817 | | 8/2023 | |

* cited by examiner

*Primary Examiner* — Lawrence S Galka
(74) *Attorney, Agent, or Firm* — Nixon & Vanderhye PC

(57) ABSTRACT

A non-limiting example game apparatus includes a processor, and the processor executes game processing of a multi-play and a solo-play. When a progress condition that is set to any mission of an overall mission including a personal mission set to a player and an others mission set to other player is satisfied based on a play by any player during the game of a multi-play, the processor progress the mission satisfying the progress condition. At the time the multi-play is to be ended, the processor ends the multi-play while holding a progress degree of the personal mission. The processor progress the mission based on the play of the player during the game of a solo-play. The processor makes the multi-play start based on the overall mission including the personal mission and others mission having the progress degrees at the time of the multi-play start.

20 Claims, 22 Drawing Sheets

OWNED MISSIONS IN MULTI-PLAY MODE

STORAGE MEDIUM, GAME CONTROL METHOD, AND GAME SYSTEM FOR WHICH A MISSION IS PROGRESSED IN SOLO-PLAY AND MULTI-PLAY OF A VIRTUAL GAME

CROSS REFERENCE OF RELATED APPLICATION

This application claims a priority to Japanese Patent Application No. 2023-179669 filed on Oct. 18, 2023, and the entire contents of which are incorporated herein by reference.

FIELD

This application describes a storage medium, a game control method and a game system, in which a mission is progressed in a virtual game.

BACKGROUND AND SUMMARY

A conventional game system makes a multi-play game progress, and calculation processing of a reward share for actions of characters is started for each character belonging to a party. When a reward obtainable condition is accomplished due to any action of characters belonging to the party, the calculation processing of the reward share for the accomplished character and other characters belonging to the same party as this character is completed, and the reward share data for each character is determined.

However, in the above-described game system, when a reward obtainable condition that is a common goal is accomplished due to any actions of the characters belonging to the party in the multi-play game, since a reward is distributed among other characters belonging to the same party as the character that accomplished the goal, it is difficult to freely start and end the multi-play game.

This application discloses a novel storage medium, game control method and game system.

Moreover, this application discloses a storage medium, game control method and game system, capable of playing a multi-play game freely without being bound by a progress degree of a mission.

A first embodiment is a non-transitory computer-readable storage medium having stored with an information processing program executable by a computer of an information processing apparatus, wherein the information processing program causes one or more processors of the computer to execute: executing game processing in a multi-play and in a solo-play, during a game of the multi-play, regarding an overall mission that is a plurality of missions including a personal mission that is at least a mission to be set to a player and an others mission that is at least a mission to be set to other player, progressing, when a progress condition that is set to any mission included in the overall mission is satisfied based on a play by any player that joins to the multi-play, the mission that satisfies the progress condition; granting a reward to the player when a progress degree of the any mission reaches a mission accomplishment condition that is a condition that the mission is accomplished; and ending the multi-play in a state that the progress degree of the personal mission is kept at a time of ending the multi-play, and during a game of the solo-play, progressing, when a progress condition that is set to any personal mission is satisfied based on a play by the player, the mission that satisfies the progress condition; granting a reward to the player when the progress degree of the any personal mission reaches a mission accomplishment condition that is a condition that the mission is accomplished; and starting the multi-play based on the overall mission including the personal mission having the progress degree at a time of starting and the others mission having the progress degree at the time of starting.

According to the first embodiment, in the multi-play, it is possible to accomplish respective missions of respective players in cooperation. Even at the time of the end of the multi-play, it is possible to keep the progress degree of the own mission. Therefore, it is also possible to further progress the mission in the solo-play. That is, when playing a game that a mission is progressed during the game, it is possible to progress the mission in cooperation in the multi-play and to start and end the multi-play while continuing a progress situation of the own mission. Therefore, it is possible to play the game freely without being bound by the progress degree of the mission.

A second embodiment is the storage medium according to the first embodiment, wherein the information processing program causes the one or more processors to execute: holding a predetermined number of the personal missions, and during the game of the multi-play game and the game of the solo-play game, completing, when any personal mission reaches the mission accomplishment condition, the any personal mission, and adding a new personal mission.

A third embodiment is the storage medium according to the second embodiment, wherein the information processing program causes the one or more processors to execute: during the game of the multi-play and the game of the solo-play game, adding a personal bonus mission as a new personal mission not included in the predetermined number of the personal missions when an accomplishment situation of the personal mission satisfies a predetermined condition.

According to the third embodiment, a personal bonus mission is added as a new personal mission, and therefore, the personal bonus mission is also sharable in the multi-play. Since the personal bonus mission generated during the multi-play game is ended while keeping the progress degree, that is, since the progress situation can be carried over at the time of ending of the multi-play, it is possible to play freely the multi-play without making it difficult to end the multi-play until the mission is accomplished.

A fourth embodiment is the storage medium according to the third embodiment, wherein the information processing program causes the one or more processors to execute: setting the condition that the personal bonus mission is added as that the personal mission is accomplished a predetermined number of times, counting, after adding the personal bonus mission, the number of accomplishment times of the personal mission that is the condition that a next personal mission is to be added regardless of accomplishment of the personal bonus mission; and adding the new personal bonus mission at a time that the condition that the next personal bonus mission is added is satisfied and the personal bonus mission being held is accomplished.

According to the fourth embodiment, it is possible to stock the condition for addition of the bonus mission. When playing the multi-play in a state that the condition for addition is stocked, it is possible to progress the bonus mission efficiently and continuously.

A fifth embodiment is the storage medium according to the third embodiment, wherein the information processing program causes the one or more processors to execute: setting an amount of a reward for each of the missions, and an amount of the reward that is set to the personal bonus mission is greater compared with other personal missions.

A sixth embodiment is the storage medium according to the third embodiment, wherein the information processing program causes the one or more processors to execute: during the game of the multi-play, adding an overall bonus mission not included in the personal missions and the other missions to the overall mission when the accomplishment situations of the personal bonus missions of all of the player joining to the multi-play satisfy a predetermined condition.

According to the sixth embodiment, it is possible to play the overall bonus mission that is limited within the multi-play in cooperation.

A seventh embodiment is the storage medium according to the sixth embodiment, wherein the information processing program causes the one or more processors to execute: setting an amount of a reward for each of the missions; setting an amount of a reward that is set to the personal bonus mission to be greater compared with other personal missions; and setting an amount of a reward that is set to the overall bonus mission to be greater compared with the personal bonus mission.

An eighth embodiment is the storage medium according to the first embodiment, wherein the information processing program causes the one or more processors to execute: during the game of the multi-play and the game of the solo-play game, discarding the personal mission being held based on an update instruction by the player, and adding a new personal mission.

According to the eighth embodiment, the player can update only the own personal mission. It is possible to avoid personal mission with difficult accomplishment.

A ninth embodiment is the storage medium according to the eighth embodiment, wherein the information processing program causes the one or more processors to execute: consuming the reward when discarding the personal mission being held based on an update instruction by the player and adding a new personal mission.

According to the ninth embodiment, since the reward is consumed, it is possible to prevent the personal mission from being frequently changed.

A tenth embodiment is a game control method of an information processing apparatus, wherein one or more processors of a computer of the information processing apparatus are caused to execute: executing a game of a multi-play and a game of a solo-plat, and during a game of the multi-play, regarding an overall mission that is a plurality of missions including a personal mission that is at least a mission to be set to a player and an others mission that is at least a mission to be set to other player, progressing, when a progress condition that is set to any mission included in the overall mission is satisfied based on a play by any player that joins to the multi-play, the mission that satisfies the progress condition; granting a reward to the player when a progress degree of the any mission reaches a mission accomplishment condition that is a condition that the mission is accomplished; and ending the multi-play in a state that the progress degree of the personal mission is kept at a time of ending the multi-play, and during a game of the solo-play, progressing, when a progress condition that is set to any personal mission is satisfied based on a play by the player, the mission that satisfies the progress condition; granting a reward to the player when the progress degree of the any personal mission reaches a mission accomplishment condition that is a condition that the mission is accomplished; and starting the multi-play based on the overall mission including the personal mission having the progress degree at a time of starting and the others mission having the progress degree at the time of starting.

An eleventh embodiment is a game system comprising a plurality of information processing apparatuses, wherein one or more processors of each of the plurality of information processing apparatuses are caused to execute: executing a game of a multi-play, and during the game of the multi-play, regarding an overall mission that is a personal mission that is at least a mission to be set to each of all players joining to the multi-play, progressing, when a progress condition that is set to any mission included in the overall mission is satisfied based on a play by any player that joins to the multi-play, the mission that satisfies the progress condition; granting a reward to each player when a progress degree of the any mission reaches a mission accomplishment condition that is a condition that the mission is accomplished; ending the multi-play in a state that the progress degree each the personal mission is kept at a time of ending the multi-play, and starting the multi-play based on the overall mission including the personal mission holding the progress degree of each of the all players at a time of starting.

According to the tenth embodiment and the eleventh embodiment, as similar to the first embodiment, in a game that a mission is progressed during the game, it is possible to progress the mission in cooperation in the multi-play and to start and end the multi-play while continuing a progress situation of the own mission.

The features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

Figure 1:
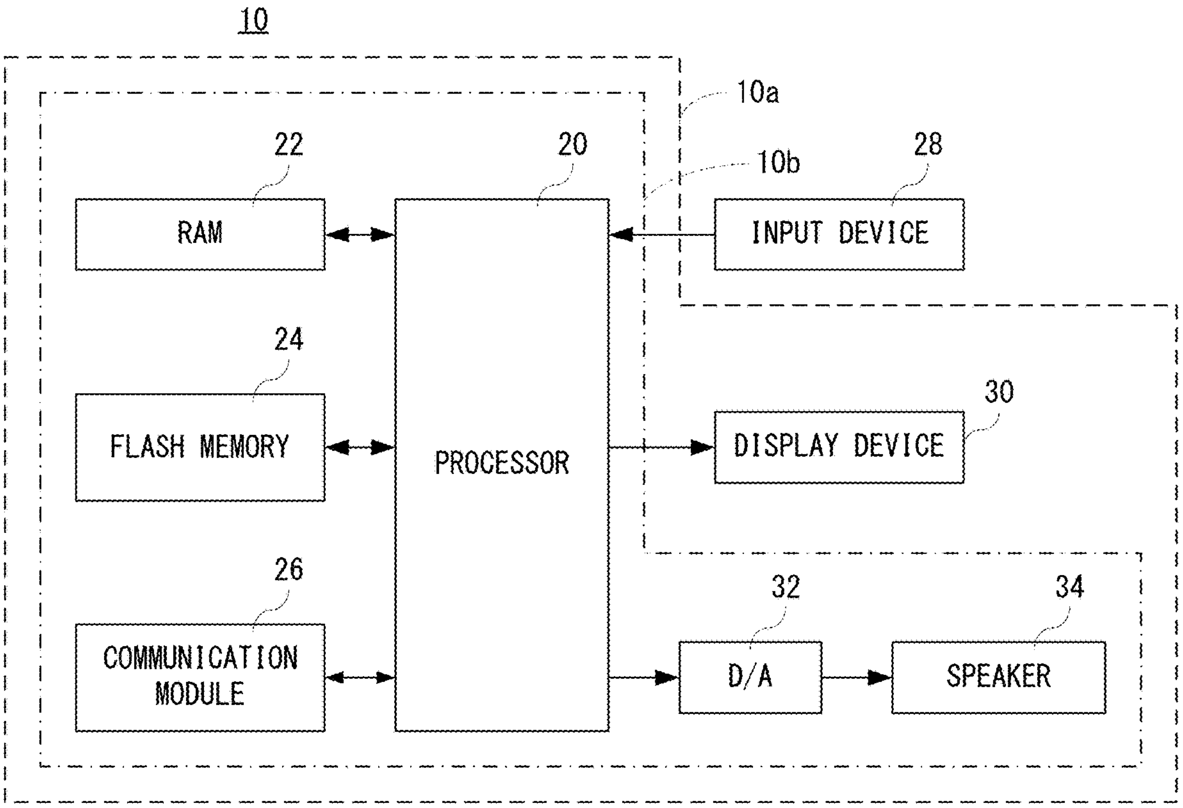
FIG. 1 is a block diagram showing non-limiting example electric structure of a game apparatus.

With reference to FIG. 1, a game apparatus 10 that is a non-limiting example information processing apparatus includes a processor 20, and the processor 20 is connected with a RAM 22, a flash memory 24, a communication module 26, an input device 28, a display device 30 and a D/A converter 32. Moreover, the D/A converter 32 is connected with a speaker 34.

The processor 20 is in charge of overall control of the game apparatus 10. Specifically, the processor 20 is an SoC (System-on-a-chip) that incorporates therein a plurality of functions, such as a CPU function, a GPU function and a video memory (VRAM).

The RAM 22 is a volatile storage medium and is used as a working memory and a buffer memory for the processor 20. The flash memory 24 is a non-volatile storage medium, and is used in order to store a game program, to store (save) various kinds of data.

For example, the game program and necessary data are read from the flash memory 24 to be stored in the RAM 22. Moreover, the processor 20 generates, in the VRAM (also referred to as "frame buffer"), image data for displaying various screens on the display device 30 using image generation data 304*b* (see FIG. 10) stored in the RAM 22, etc., and outputs the generated image data to the display device 30.

However, an application corresponds to applications regarding various kinds of information processing, such as a game application, a document creation application, an email application, a drawing application, a character practice application, a language training application, a learning application, etc.

The communication module 26 performs a communication (specifically, wireless communication) with external apparatuses via a network. In the embodiment, the communication module 26 performs communication with the external apparatuses while being connected to a wireless LAN with a system conformed to Wi-Fi standard as a first communication mode. Moreover, the communication module 26 performs a wireless communication with the same or similar type game apparatus 10 with a predetermined communication system (e.g., a communication by a unique protocol and infrared communication) as a second communication mode. In addition, the wireless communication according to the above-described second communication mode can perform a wireless communication with other game apparatuses 10 arranged in a closed LAN, and realize a function that enables so-called "local communication" that data is transmitted and received through a direct communication with a plurality of game apparatus 10.

The input device 28 is a game controller provided with various kinds of push buttons, keys or switches that are provided on the game apparatus 10, for example, and is used by a user or player (hereinafter, simply referred to as "player") for various kinds of operations, such as menu selection, instructions in an application. For example, the game controller is provided with an A button, a B button, an X button, a Y button, an L button, an R button, a cross button (and/or a slide stick), etc. However, in a case of a portable game apparatus 10, in addition to the push buttons, keys or switches, a touch panel may be provided as the input device 28.

The display device 30 is a display device such as an LCD or an organic EL. However, when the game apparatus 10 is a stationary type game apparatus, as described later, the display device 30 is provided separately from a main body apparatus 10*b* of the game apparatus 10.

The D/A converter 32 converts sound data given from the processor 20 into an analog audio signal, and outputs the same to the speaker 34. However, the sound data may be data regarding the sound, such as a sound generated by a character or object, a sound effect and a BGM.

In addition, the electric structure of the game apparatus 10 shown in FIG. 1 is a mere example, and should not need to be limited to this. For example, the communication module 26 may be omitted.

Moreover, the input device 28 may be a game controller provided separately from a main body apparatus 10*a* of the game apparatus 10, and connected communicably to the processor 20 with a wire or wireless. In this case, the game apparatus 10 constitutes a game system that the main body apparatus 10*a* and the input device 28 are communicably connected to each other.

Furthermore, in addition to the input device 28, the display device 30 may also be provided separately from the main body apparatus 10*b* of the game apparatus 10, and connected communicably to the processor 20 with a wire or wireless. In this case, the game apparatus 10 constitutes a game system that the main body apparatus 10*b*, the input device 28 and the display device 30 are communicably connected. Moreover, as the display device 30, a stationary monitor such as an LCD or an organic EL can be used.

Furthermore, as the game apparatus 10, it is possible to use a game dedicated machine of a portable type or stationary type as well as other information processing apparatuses capable of functioning as a game machine, such as a personal computer, a tablet terminal, a wearable terminal, a cellular phone and a smartphone.

When the player uses the game apparatus 10 to instruct execution of the game application of the virtual game of the embodiment, the virtual game is started. The virtual game can be started from the beginning or from a point saved last time.

Next, an outline of the game according to the embodiment will be described. The virtual game of the embodiment is a so-called RPG, and in a virtual space, a player character object (hereinafter, referred to as "player object") is moved according to an operation of the player, and when encountering a monster character object (hereinafter, referred to as a "monster object"), the player object may fight against the monster object, capture the monster object or shoot (photograph) the monster object according to an operation of the player. Moreover, a mission(s) is (are) set to the player, and at least one of the missions is progressed or accomplished according to a play result. An action of the player object is basically controlled according to an operation of the player with respect to the input device 28. An action of the player object is controlled by a computer (i.e., processor 20) in a predetermined case. Moreover, an action of the monster object is controlled by the computer.

The player of the game apparatus 10 plays a virtual game in a solo-play mode (also referred to as a single-play mode) or in a multi-play mode.

Figure 2:
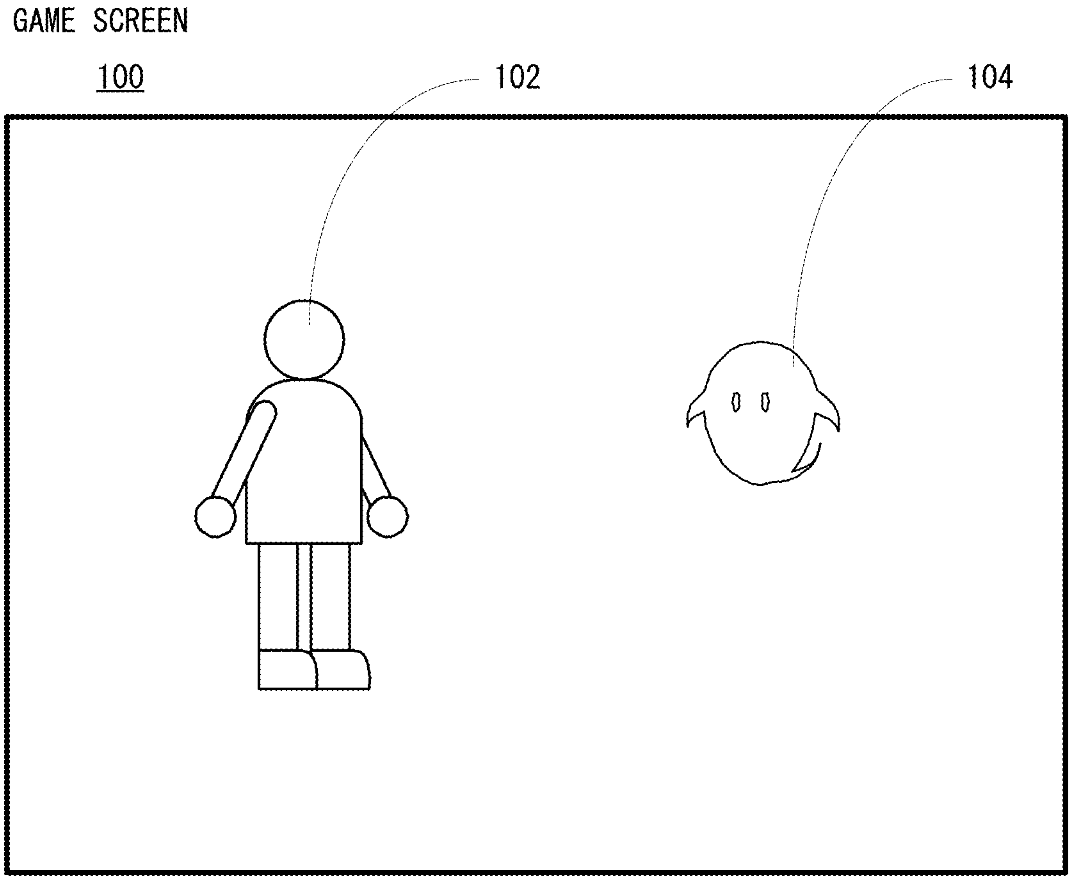
FIG. 2 is a view showing a first non-limiting example game screen displayed on a display device of the game apparatus shown in FIG. 1.

FIG. 2 is a view showing a non-limiting example game screen 100 in the solo-play mode. In the game screen 100 shown in FIG. 2, a player object 102 of the player (hereinafter, referred to as "player A") is displayed, and a monster object 104 is displayed near the player object 102. Background objects are omitted.

In the virtual game of the embodiment, a predetermined number of normal missions are set to the player A. The predetermined number is three in the embodiment. In other embodiments, the predetermined number may be one, two or four or more. The normal mission is a part of missions. Moreover, the mission(s) set to the player (here, player A) is called personal mission. If a progress condition set to the normal mission is satisfied based on the play of the player A, the normal mission is progressed, and if a progress degree satisfies an accomplishment condition of the normal mission, the normal mission is accomplished (or cleared). Regarding progress and accomplishment, the same applies to a bonus mission and a team mission that will be described later. The progress condition is a condition for progressing the mission set for each mission. The accomplishment condition is a mission accomplishment condition set for each mission, and is a condition that the progress condition is satisfied a predetermined number of times (the number of times may be one time) or reaches a predetermined amount. The number of times or the amount that will satisfy the accomplishment condition and the number of times or the amount that will satisfy the progress condition may be expressed with numerical values during the mission that is being progressed. Specifically, as to a mission that the accomplishment condition is "Capture three monitors", the progress condition is to capture a monster, and the mission is accomplished is to capture monsters three times. As to a mission that the accomplishment condition is "Move 500 meters", moving is the progress condition, and the mission is accomplished if a moving distance reaches 500 meters. Hereinafter, numerical values set for these may be referred to as a numerical value of the progress condition or a numerical value of the accomplishment condition.

If the normal mission is accomplished, a reward that is set to this normal mission is granted to the player A. The reward is a point (or in-game currency) as an example; however, instead of the point, the reward may be an item, an experience value of the player object 102, a physical strength point value, etc.

The normal mission is a mission different from the bonus mission and the team mission, and a mission with low difficulty of accomplishment as compared with the bonus mission and the team mission. As an example, the normal mission includes missions, such as "Capture three monsters", "Defeat one monster", "Move 500 meters", "Pick up ten items", "Shoot one monster", "Use techniques three times", and so on.

Figure 3:
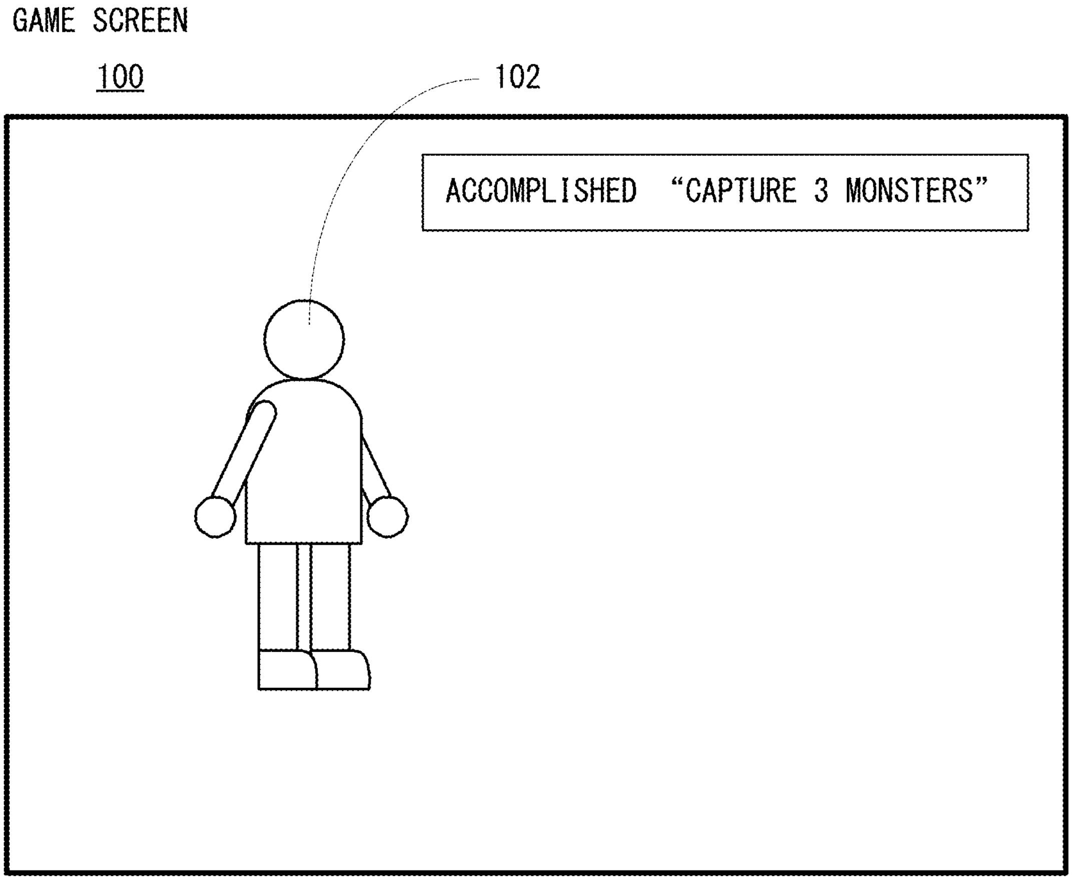
FIG. 3 is a view showing a second non-limiting example game screen displayed on a display device of the game apparatus shown in FIG. 1.

FIG. 3 is a view showing another non-limiting example game screen 100 in the solo-play mode. In the game screen 100 shown in FIG. 3, the player object 102 is displayed and a message display frame 106 is provided in an upper right portion of the screen. In the message display frame 106, a character string of a message that a normal mission (here, "Capture three monsters") is accomplished is displayed. That is, the player A is notified that the normal mission is accomplished. The game screen 100 of FIG. 3 is an example, and it may be displayed only that the normal mission is accomplished (e.g., only a character string of "accomplishment").

A normal mission is set to the player A when starting a virtual game in the solo-play mode while drawn lots out of all the normal missions prepared in advance. However, when starting a game from a saved point, a normal mission at the point of being saved is set.

Moreover, when the normal mission is accomplished a first predetermined number of times (in the embodiment, ten times), that is, if an accomplishment situation of a personal mission satisfies a predetermined condition, a bonus mission is drawn lots out of all the bonus missions prepared in advance to be set (or added) to the player A. Here, a condition to be add a bonus mission to a personal mission (hereinafter, referred to as "condition for addition") is stocked, and the number of stocks of the condition for addition is set as 1 (one).

The bonus mission has high difficulty as compared with the normal mission, and a reward to be granted when being accomplished is greater that a reward to be granted when the normal mission is accomplished. As an example, the bonus mission includes missions, such as "Capture 30 monsters", "Defeat 20 monsters", "Search three rare items", "Shoot five monsters being moved", and so on. However, the bonus mission may be a mission that has difficulty lower than the normal mission but takes more time and/or effort to accomplish and more reward is granted.

A second predetermined number of bonus missions (in the embodiment, 1 (one)) can be set to the player A, and when a bonus mission has been already set to the personal mission, a bonus mission is not added even if the normal mission is accomplished the first predetermined number of times. In this case, the condition for addition of a bonus mission is stocked. However, a maximum value of the number of the stocks (in the embodiment, 3 (three)) is determined, and a bonus mission is not stocked more than the maximum value. However, the number of the stocks does not need to be limited.

When the bonus mission is accomplished, a reward that is set to this bonus mission is granted to the player A. Moreover, when the bonus mission is accomplished, the accomplished bonus mission is deleted, and if the number of the stocks is one or more, a new bonus mission is immediately set. However, if the number of the stocks is 0 (zero), a new bonus mission is not set.

That is, the player (here, player A) has always three normal missions, and one bonus mission if further satisfying a condition. That is, personal missions are three normal missions or three normal missions and one bonus mission.

Figure 4:
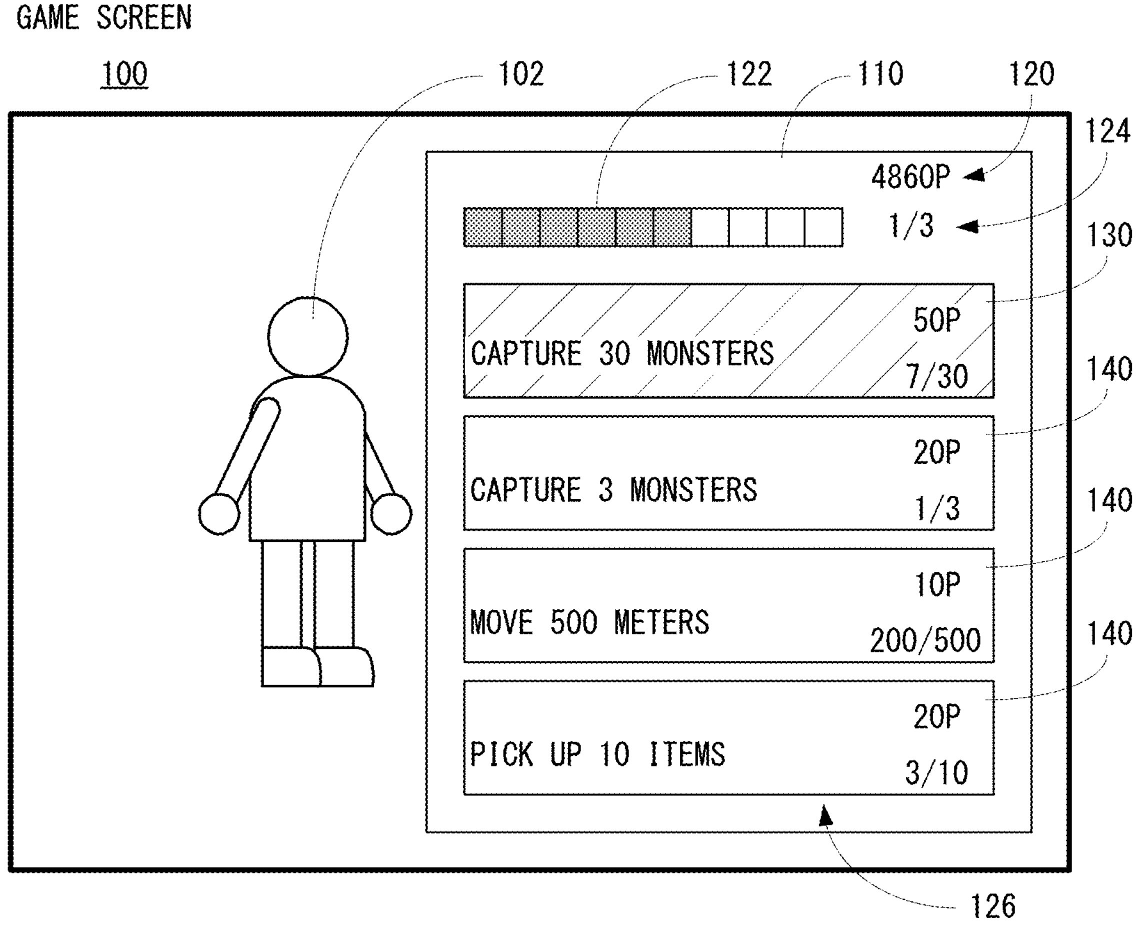
FIG. 4 is a view showing a third non-limiting example game screen displayed on the display device of the game apparatus shown in FIG. 1.

FIG. 4 is a view showing a further non-limiting example game screen 100 in the solo-play mode. In the game screen 100 shown in FIG. 4, an image of a mission board 110 is displayed in front of the game image including the player object 102, etc. The image of the mission board 110 is a list display screen for viewing information regarding all missions owned by the player A and for changing personal missions set to the player A. The mission board 110 is displayed according to an operation of the player A, and is hidden according to an operation of the player A.

As shown in FIG. 4, a point display portion 120 is provided in an upper right portion of the mission board 110. The point display portion 120 displays the total number of points owned by the player A (hereinafter, referred to as "owned point"). A point that is granted when the personal mission owned by the player is accomplished is added to the owned point. The point consumed when exchanging for an item in a virtual game or changing (or updating) a personal mission is subtracted from the owned point.

Moreover, in the mission board 110, a bar display portion 122 and a stock display portion 124 are provided below the point display portion 120 side by side. The bar display portion 122 is a display portion for displaying the number of times that the normal mission is accomplished (hereinafter, referred to as "first number of accomplishment times"). The stock display portion 124 is a display portion that displays the current number of the stocks to the maximum number of the stocks with a fraction.

The bar display portion 122 is composed of ten squares arranged horizontally. When the normal mission is accomplished once, one square in the bar display portion 122 is filled with a predetermined color. In the embodiment, when the normal mission is not accomplished once, all of ten squares of the bar display portion 122 are smeared away black, and each time the normal mission is accomplished, the squares are changed to light blue, starting with the leftmost square. If the normal mission is accomplished ten times, the number of the stocks is incremented by 1 (one), and a bonus mission is set or added.

If a normal mission is further accomplished in a state that this bonus mission has not been accomplished, for each time of accomplishment of the normal mission, whenever a normal mission will be accomplished, the squares are filled in yellow, starting with the leftmost square. In the state that the above-described bonus mission has not been accomplished, if the normal mission is further accomplished ten times, that is, if up to the rightmost square is changed to yellow, the number of the stocks is incremented by 1 (one).

Furthermore, if a normal mission is accomplished in the state that the above-described bonus mission has not been accomplished, for each time of accomplishment of the normal mission, the squares are filled in orange starting with the leftmost square. In the state that the above-described bonus mission has not been accomplished, if the normal mission is further accomplished ten times, that is, if up to the rightmost square is changed to orange, the number of the stocks is incremented by 1 (one).

If the number of the stocks reaches the maximum value, that is, if the normal mission is accomplished 30 times in the state that the bonus mission has not been accomplished, even if a normal mission is further accomplished, the first number of accomplishment time is not counted, and the color of the squares is not changed. However, if the first number of accomplishment times of the normal mission is counted up to ten, the number of the stocks is incremented by 1 (one) and the first number of accomplishment times is reset. This is repeated until the number of the stocks reaches the maximum value.

If the bonus mission set to the player A is accomplished, the number stocks is decremented by 1 (one), and the first number of accomplishment times of the normal mission is decremented by 10 (ten). Therefore, a color of the bar display portion 122 is changed. If the first number of accomplishment times is decremented by 10 (ten), the orange squares are changed to yellow, the yellow squares are changed to light blue, and the light blue squares are changed to black.

Furthermore, in the mission board 110, a mission display portion 126 is provided below the bar display portion 122 and the stock display portion 124. Four mission UI images are displayed in the mission display portion 126 vertically. The mission UI image can be selected by designating, and within a frame of the mission UI image, contents of the mission associated with this mission UI image, a progress degree of the mission and a reward that is granted in case of accomplishment are described. However, when the selected mission UI image is designated again, a selected state is canceled.

In an example shown in FIG. 4, the mission UI image 130 of the uppermost is a mission UI image to which a bonus mission is corresponded, and three mission UI images 140 below the same are mission UI images to which the normal missions are corresponded. As for the mission UI image 130 and the mission UI images 140, a background color is set as differentness colors. In order to represent that the background colors are different from each other, slant lines are applied to the background of the mission UI image 130.

The contents of missions are displayed by character strings. The progress degrees of missions are displayed each using a fraction. However, the number in the denominator is a numerical value of a mission accomplishment condition, and the number in the numerator is the progress degree of the mission, which is counted for each predetermined number. However, the progress degree may be displayed using a bar graph. Furthermore, the progress degree may be using both a fraction and a bar graph. A reward is displayed using a numeric character.

For example, as to the mission UI image 140 in the uppermost among the three mission UI images 140 shown in FIG. 4, "Capture three monsters" is displayed as the content of the mission, "⅓" is displayed as the progress degree, and "20P" is displayed as the reward. However, "P" means the point. That is, the numerical value of the mission accomplishment condition is three (3) (monsters), and the numerical value of progress condition is one (1) (monster).

Moreover, as to the mission UI image 140 in the middle among the three mission UI images 140 shown in FIG. 4, "Move 500 meters" is displayed as the content of the mission, "200/500" is displayed as the progress degree, and "10P" is displayed as the reward. That is, the numerical value of the mission accomplishment condition is 500 (meters), and the numerical value of progress condition is one (1) (meter). In addition, a moving distance is a distance in the virtual space.

Although a description is omitted, the same applies to the mission UI image 130 and the mission UI image 140 of the lowermost.

By displaying the image of the mission board 110, the player A can confirm the contents, progress degree and the reward of a personal mission, and the first number of accomplishment times and the number of the stocks.

Moreover, it is possible for the player A to change his/her personal mission by consuming the owned point. Therefore, the player A can avoid a personal mission with difficult accomplishment. However, since the owned point is consumed, it is possible to prevent the personal mission from being frequently changed.

Figure 5:
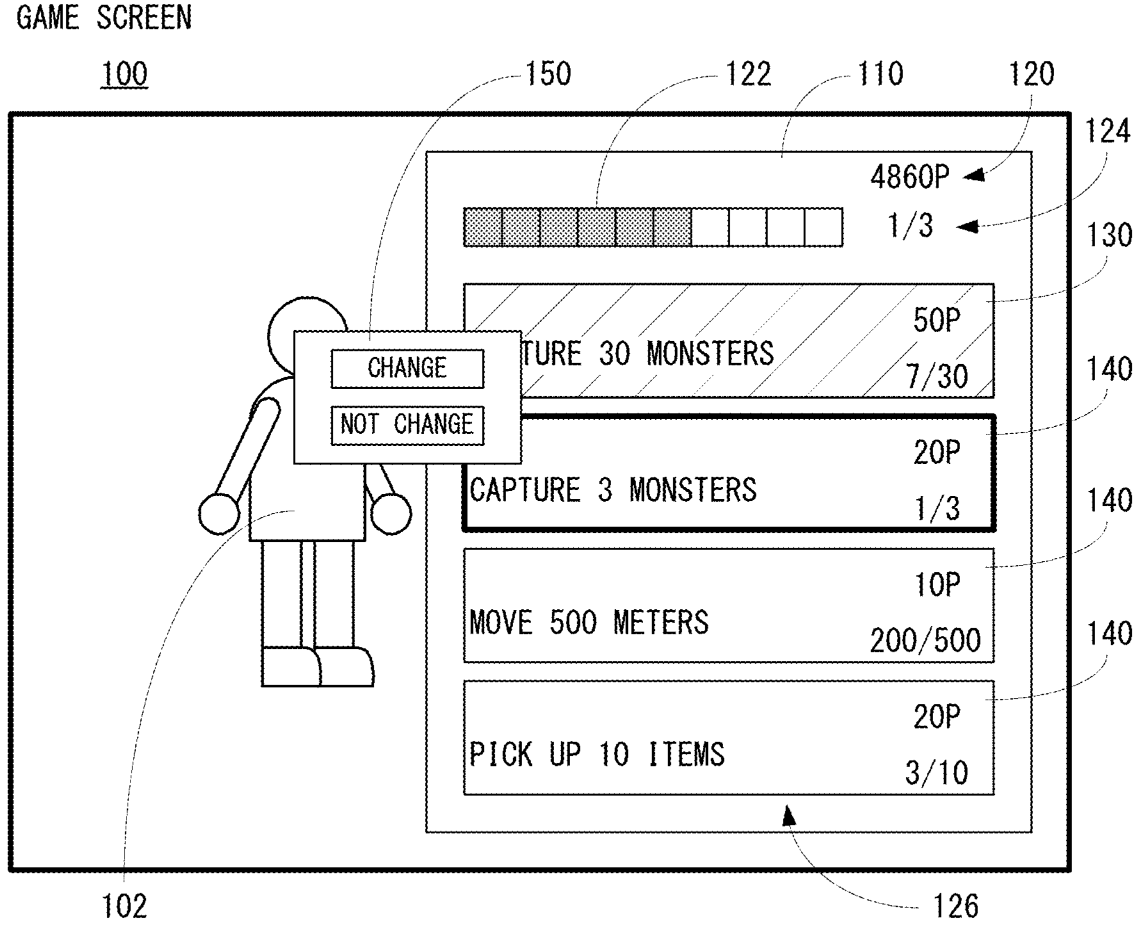
FIG. 5 is a view showing a fourth non-limiting example game screen displayed on the display device of the game apparatus shown in FIG. 1.

FIG. 5 is a view showing other non-limiting example game screen 100 in the solo-play mode. In the game screen 100 shown in FIG. 5, a mission UI image 140 corresponding to one normal mission is selected and a menu window 150 is displayed. The game screen 100 shown in FIG. 5 indicates by showing a display frame of the mission UI image 140 with a thick line that this mission UI image 140 is selected.

If changing of the mission is selected in the menu window 150, a bonus mission corresponding to the selected mission UI image 130 or a normal mission corresponding to the mission UI image 140 is changed. When a bonus mission is changed, the current bonus mission corresponding to the selected mission UI image 130 is deleted or canceled, and one other bonus mission except the current bonus mission is drawn lots. When a normal mission is changed, the current normal mission corresponding to the selected mission UI image 140 is deleted or canceled, and one other normal mission except the current normal missions is drawn lots.

The point is consumed when changing a bonus mission or a mission. That is, the point to be consumed is subtracted from the owned point. The point to be consumed is a point of the half of the reward obtained when the bonus mission or the normal mission that is to be changed is accomplished. This is an example, the point to be consumed when changing a bonus mission and the point to be consumed when changing a normal mission may be set uniformly, respectively. Moreover, all the point to be consumed when changing a bonus mission and a normal mission may be set uniformly.

In addition, the progress degree of the bonus mission or the normal mission the has been deleted is not succeeded, and if the bonus mission or the normal mission is changed, the progress degree of the bonus mission or the normal mission after change is set as 0 (zero).

Moreover, the player A can invite other players in the solo-play mode so as to form a team with their players who have requested to entry in response to this invitation and play a virtual game in the multi-play mode with a team of a plurality of players.

The game apparatus 10 transmits a team formation request for inviting other players to a network such as Internet according to an operation of the player A. A player of other game apparatus 10 connected communicably to Internet transmits an entry request on the team to be formed to the game apparatus 10 of the player A in response to the team formation request. However, the virtual game of the embodiment is being executed also in other game apparatus 10. When the number of other players that transmit the entry request reaches the invitation number, or when the number of other players that transmit the entry request is one or more within a time limit, the game apparatus 10 of the player A establishes a connection state with one or more game apparatuses 10 of one or more other players that transmit the entry request to form a team, and starts the virtual game in the multi-play mode. However, the invitation number is the number obtained by subtracting 1 (one; for player A) from the maximum number (e.g., 4 (four)) of players forming the team.

Moreover, the player A can request an entry to the invitation from other players in the solo-play mode to form a team with other players, thereby to play a virtual game in the multi-play mode with the team of a plurality of players.

Figure 6:
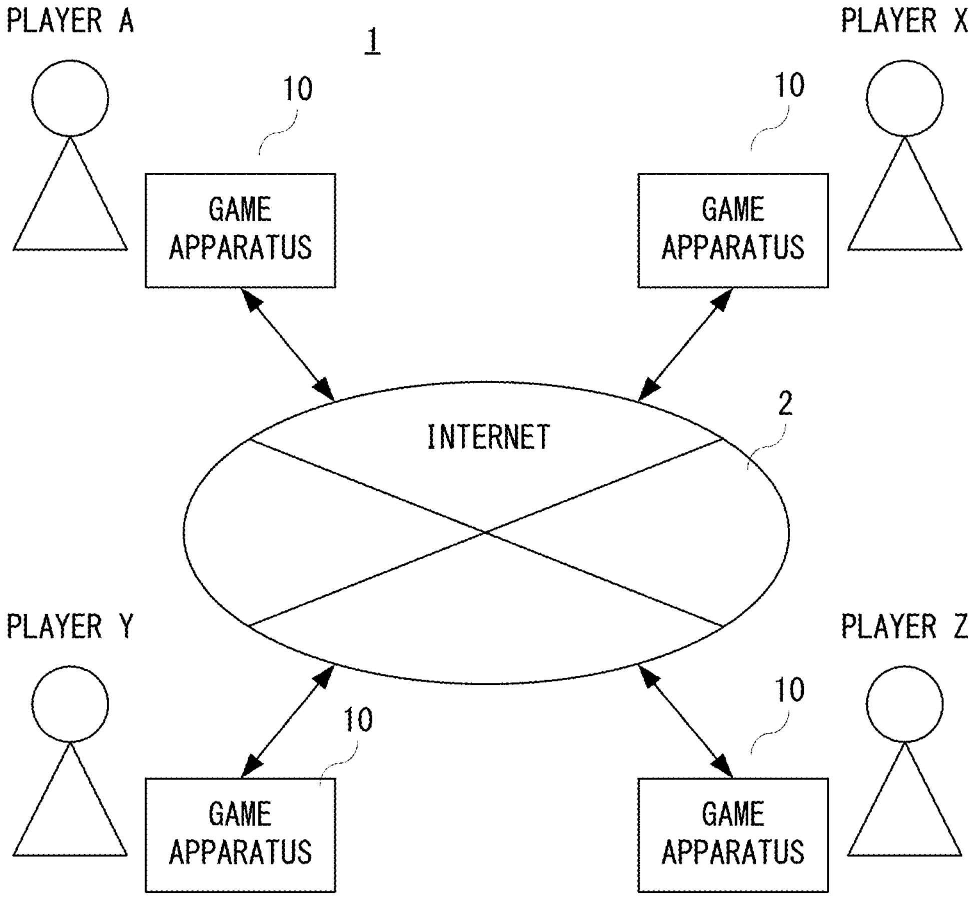
FIG. 6 is a view showing a non-limiting example game system in a case of playing a multi-play game with four players.

FIG. 6 is a block diagram showing a non-limiting example game system 1 in a case of playing a virtual game in the multi-play mode. As shown in FIG. 6, the game system 1 includes four game apparatuses 10 that are communicably connected to Internet 2, respectively and further established mutually in a connection state. The game system 1 includes the game apparatus 10 of the above-described player A and respective game apparatuses 10 of other three players (e.g., player X, player Y and player Z) that form a team.

In addition, the game system 1 is an example, and a plurality of game apparatuses 10 that are playable in the multi-play mode may be directly connected to each other via a local communication.

Moreover, in the embodiment, the same type of game apparatus 10 is used for all of the plurality of game apparatuses 10 that play in the multi-play mode; however, other types of apparatuses can be used as long as they are capable of playing the virtual game in the embodiment and establishing the connection state with the game apparatus 10.

In the following, although it will be described a case where a virtual game is played in the multi-play mode, when it is not necessary to especially distinguish the player A, X, Y and Z, only indicated as a “player”.

When playing a virtual game in the multi-play mode, prior to starting a play, each player transmits and receives personal mission(s) of themselves and the progress degree of each mission to or from each other. Therefore, in the multi-play mode, each player has, in addition to his/her own personal missions, the personal missions of other players (hereinafter, may be referred to as “others”). That is, all missions owned by each player (hereinafter, referred to “owned missions”) includes his/her personal mission(s) and the personal mission(s) of others. Thus, the player can start the game in the multi-play mode while continuing their progress degrees (or progress situations) of themselves. In addition, the owned missions corresponding to an overall mission.

Moreover, when playing the multi-play, the number of the stocks that is the condition for addition of the bonus mission is kept. Therefore, it is possible to progress the bonus mission efficiently and continuously.

In each game apparatus 10 in the multi-play mode, an action of an own player object is controlled according to an operation of the player, and an action of each of other player objects is controlled according to an operation of each of other players. Moreover, in each game apparatus 10, a mission that satisfies the progress condition out of the owned missions is progressed based on the play of each player. In the multi-play mode, owned missions include not only own personal missions but also the personal missions of others (corresponding to “others mission”, the same applies hereinafter). Therefore, it is possible for each player to progress and accomplish their personal mission while cooperating with each other. Moreover, when a plurality of same missions are included in the owned missions, all the plurality of same missions can be progressed.

When the virtual game is being played in the multi-play mode, that is, during the multi-play game, each player transmits the progress degree of each mission included in their owned missions to other players. That is, the game apparatus 10 of each player transmits and receives the progress degree of each mission included in their owned missions to or from each of the game apparatuses 10 of other players.

In each game apparatus 10, the progress degrees of respective missions included in the owned missions of themselves are integrated into the progress degrees of the respective missions included the owned missions of others. Specifically, the progress degree of the mission included in the owned missions is updated (i.e., progressed) by the progress degrees of the missions that are progressed by other players. The mission can be accomplished when a mission accomplishment condition is satisfied as a result of integration. At this time, when the mission has been already deleted because the accomplishment condition is satisfied by themselves, the progress degree does not need to be integrated for that mission. Moreover, a mission newly added in other game apparatuses 10 among the missions included in the owned missions received from other game apparatuses 10 is added to the owned missions of themselves. It is possible occur that the information that the previous mission is accomplished on other game apparatuses 10 and the information that a mission is newly added due to the accomplishment may be obtained at the same time.

Moreover, if there is a mission that the progress degree satisfying the accomplishment condition when the progress degree of each mission included in the owned missions of themselves is integrated with the progress degree of each mission included in the owned missions of others, the reward for the mission that satisfies the accomplishment condition is granted to the player. The accomplishment condition is satisfied when the progress degree reaches till the completion of a mission. When the accomplished the mission is a normal mission of themselves, a new normal mission is set. Moreover, if the first number of accomplishment times reaches the first predetermined number of times, the number of the stocks of the condition for addition of a bonus mission is incremented by 1 (one). Furthermore, if the number of the stocks after being decremented is one or more when the accomplished the mission is a bonus mission of themselves, a new bonus mission is set.

Moreover, the game apparatuses 10 of the respective players transmit and receive information of a position, a direction and an action of each player object (hereinafter, referred to as "player object control information") mutually. However, the player object control information is generated in each game apparatus 10 according to an operation of each player, i.e., based on the play of each player. Therefore, the game apparatus 10 controls the own player object according to an operation of the player, and controls other player objects according to the player object control information received from other game apparatuses 10.

A game screen 100 in the multi-play mode is approximately the same as the game screen 100 in the solo-play mode, and other player objects may be displayed in addition to the own player object 102. Regardless of the solo-play mode or the multi-play mode, the virtual camera follows the player object from the back in the virtual space. The virtual camera is set in a position and a direction to see in bird's-eye view from the diagonal upper part behind the player object 102. Therefore, when other player objects are located in a shooting range of the virtual camera, other player objects are also displayed on the game screen 100.

Moreover, during the multi-play game, if the number of times that the bonus mission is accomplished by all the players (hereinafter, referred to as "second number of accomplishment times") reaches the second predetermined number of times (in the embodiment, 3 (three)), a mission, i.e., a team mission is set to the team that plays the virtual game in the multi-play mode. The team mission is a mission set in common with respective players in the team. When the team mission is set, a mission UI image 160 corresponding to the team mission is displayed in the upper most of the mission display portion 126 of the mission board 110. A background color of the team mission UI image 160 is different from the background colors of the mission UI image 130 of the bonus mission and the mission UI image 140 of the normal mission. Moreover, the team mission has high difficulty as compared with the bonus mission, and a reward granted when being accomplished is greater than a reward granted when the bonus mission is accomplished. As an example, a team mission is a mission, such as "Capture extremely rare monster", "Find three extremely rare items", "Defeat five monsters by special move", and so on. However, it is conceivable that the team mission is a mission that has difficulty lower than the bonus mission but takes more time and/or effort to accomplish and more reward is granted.

Figure 7:
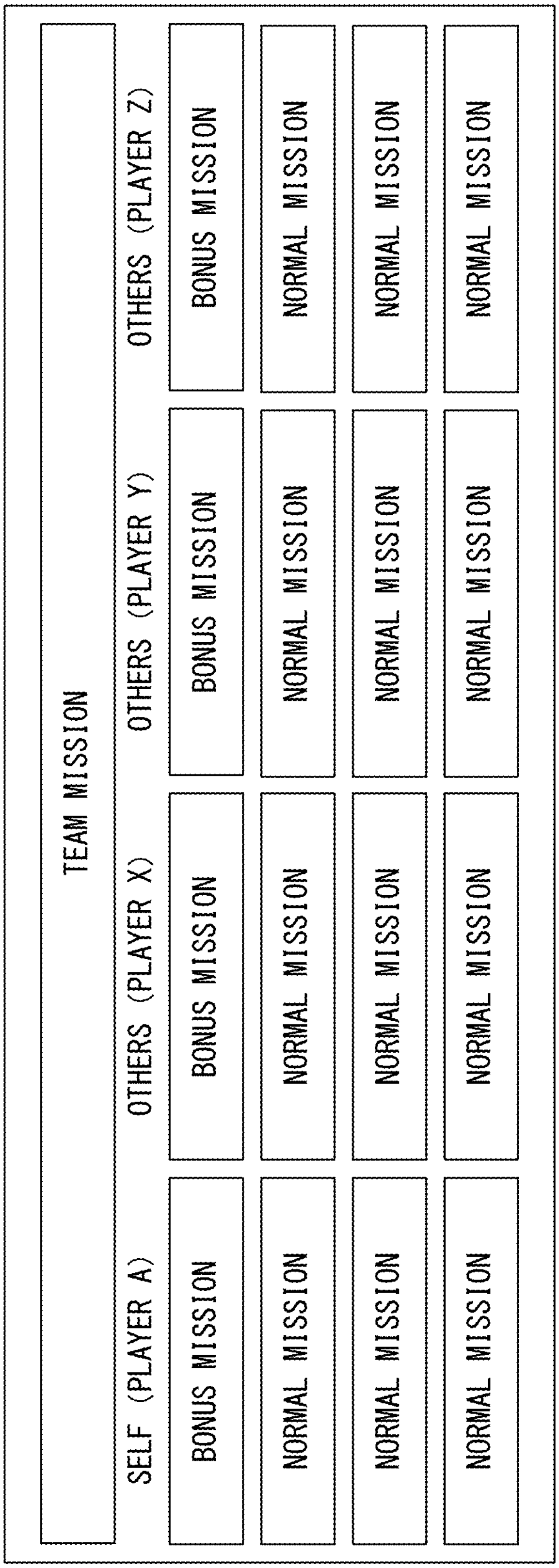
FIG. 7 is a view showing non-limiting example owned missions of a player during the multi-play game.

Therefore, in a case where the game is played in the multi-play mode and the number of players forming the team is the maximum number, the owned missions of each player may include a team mission in addition to the owned missions of themselves and the personal mission of 3 (three) other players. Moreover, when a bonus mission is added to each personal mission, the number of the owned missions of each player is 17 (seventeen) at the maximum. Specifically, as shown in FIG. 7, the owned missions of each player include a team mission, a personal mission for own machine of the player (here, player A), a personal mission of first other player (here, player X), a personal mission of a second other player (here, player Y) and a personal mission of third other player (here, player Z), and each personal mission includes one bonus mission and three normal missions.

In also the multi-play mode, the player can confirm the owned missions, etc. by displaying the mission board 110. As described above, the number of the missions included in the owned missions is 17 (seventeen) at the maximum. Therefore, in the multi-play mode, the mission UI image corresponding to a part of missions is displayed on the mission board 110, and the mission UI images corresponding to other missions are displayed by scrolling.

Figure 8:
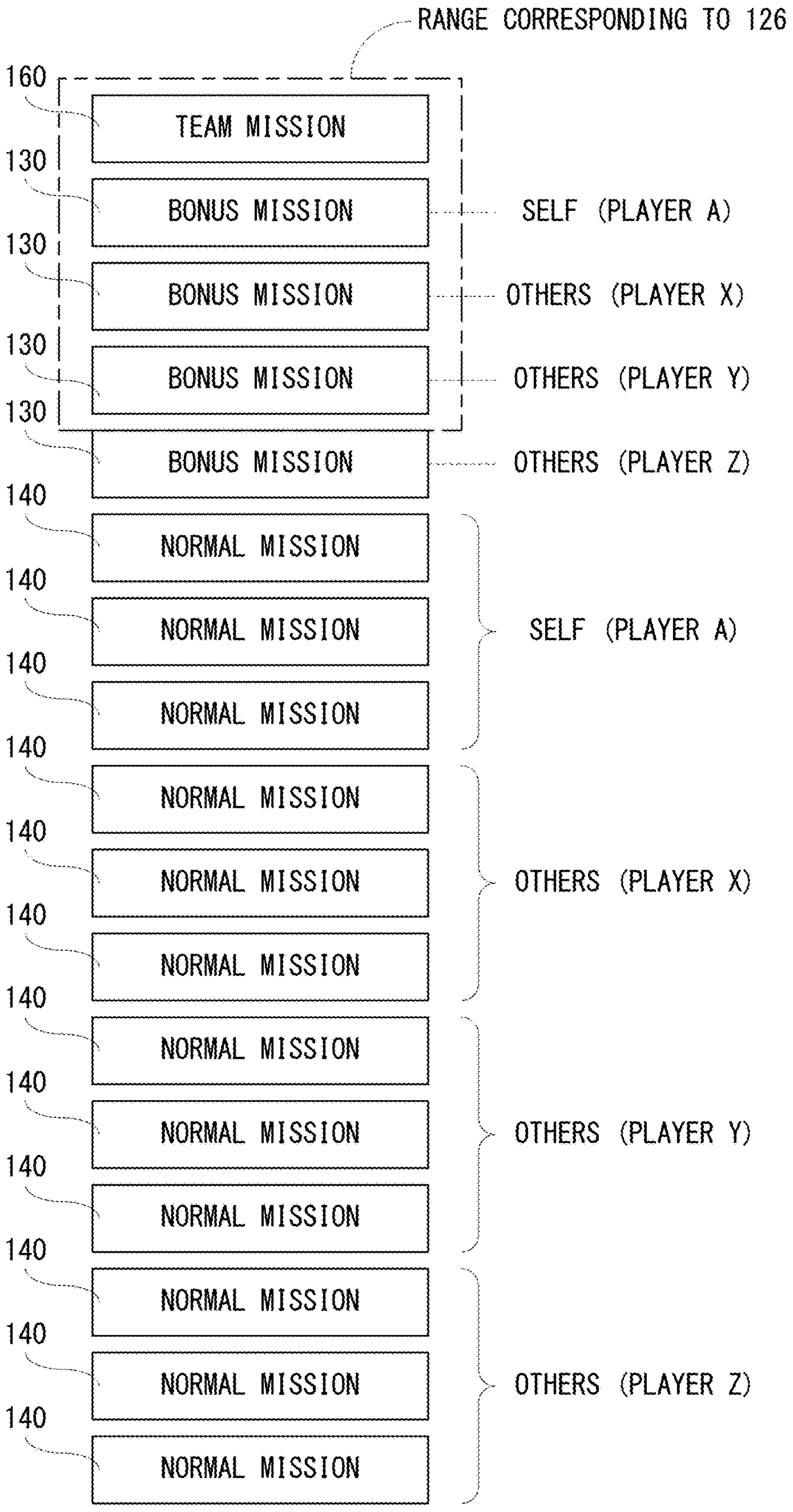
FIG. 8 is a view showing a non-limiting example method of displaying mission UI images corresponding to the owned missions of the player during the multi-play game on a mission board.

FIG. 8 is a view showing a non-limiting example method of displaying a mission UI image on the mission board 110 in the multi-play mode. In the embodiment, mission UI images corresponding to up to 17 missions are arranged vertically on a two-dimensional plane in the virtual space. Specifically, the mission UI image 160 corresponding to the team mission is arranged in the upper most position. Next, the mission UI image 130 corresponding to the bonus mission of the player A, the mission UI image 130 corresponding to the bonus mission of other player X, the mission UI image 130 corresponding to the bonus mission of other player Y and the mission UI image 130 corresponding to the bonus mission of other player Z are arranged in order. Furthermore, three mission UI images 140 corresponding to three normal missions of the player A, three mission UI images 140 corresponding to three normal missions of other player X, three mission UI images 140 corresponding to three normal missions of other player Y and three mission UI images 140 corresponding to three normal missions of other player Z are arranged in order.

Moreover, a frame of a dotted line shown in FIG. 8 is a range corresponding to the mission display portion 126 in the mission board 110, and four mission UI images displayed in the mission display portion 126 are changed according to a scrolling operation by the player. However, as described above, the team mission and the bonus mission may not be set. In this case, the mission UI images are arranged close to the upper portion.

Figure 9:
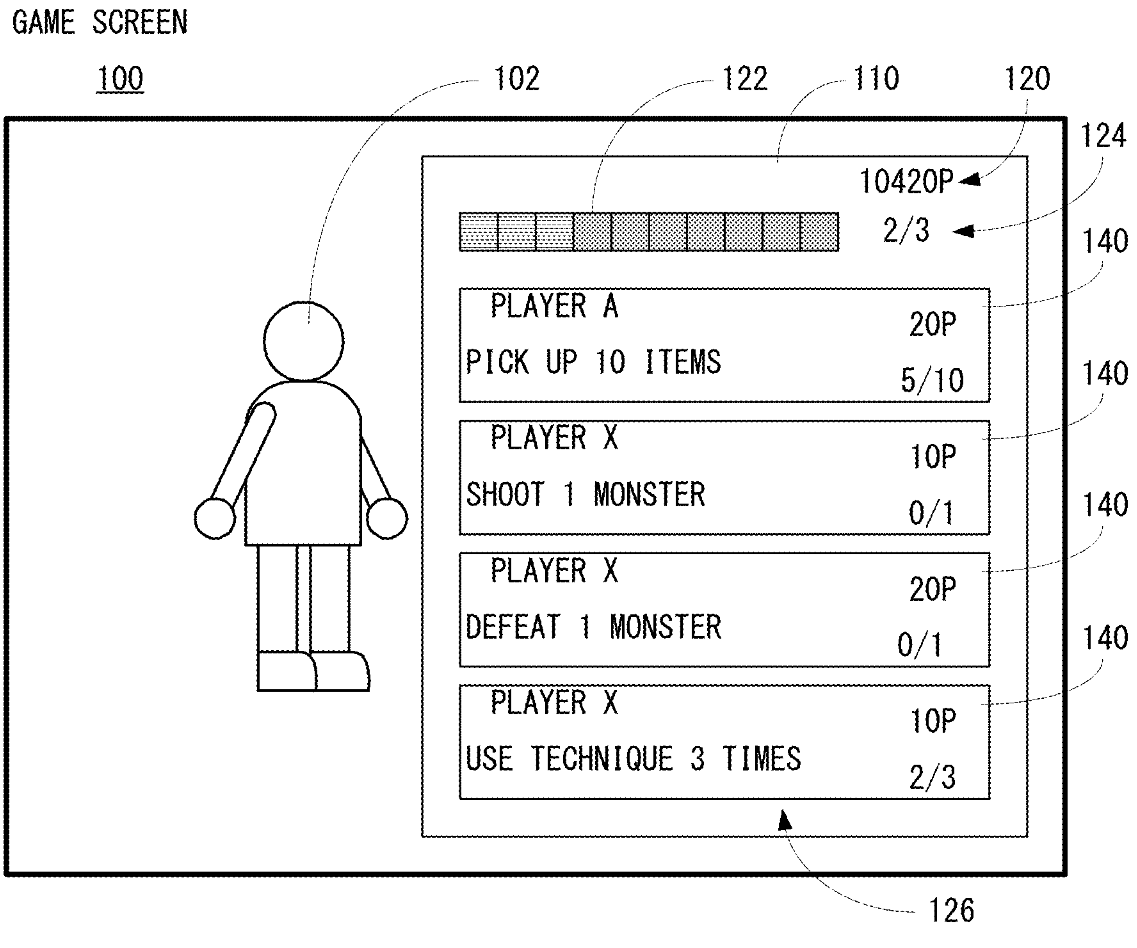
FIG. 9 is a view showing a fifth non-limiting example game screen displayed on the display device of the game apparatus shown in FIG. 1.

FIG. 9 is a view showing a non-limiting example game screen 100 in the multi-play mode. An image of the mission board 110 is displayed in the game screen 100 shown in FIG. 9. In this mission board 110, one mission UI image 140 corresponding to one normal mission of the player A and three mission UI images 140 corresponding to three normal missions of other player X are displayed. As shown also in FIG. 9, in the multi-play mode, a player name of the player that the personal mission is set is displayed on each of the mission UI images. Accordingly, it is possible for each player to determine whether the personal mission is to be set to them or to be set to others.

In also the multi-play mode, the mission included in the owned missions is progressed based on the play of the player. At this time, when there is a mission that the progress degree satisfies the accomplishment condition, a reward for the mission that satisfies the accomplishment condition is granted to the player. When the accomplished mission is a normal mission of themselves, a new normal mission is set. Moreover, if the first number of accomplishment times reaches the first predetermined number of times, the number of the stocks of the condition for addition of a bonus mission is incremented by 1 (one). Furthermore, if the number of the stocks after being subtracted is one or more when the accomplished mission is the bonus mission of themselves, a new bonus mission is set.

Moreover, in also the multi-play mode, it is also possible for the player to change a personal mission of themselves. Since a method of changing a personal mission is the same as a case described in the solo-play mode, a duplicate description will be omitted.

Furthermore, if any one of the players leaves from the team in the multi-play mode, the team is disbanded and the multi-play mode will be ended. When the multi-play mode is ended, the virtual game is resumed in the solo-play mode. At this time, the team mission and the personal mission of other players are eliminated. However, the personal mission of themselves and its progress degree are held.

Therefore, the player can also end the multi-play while continuing the progress degree of personal mission of themselves. Since the play in the multi-play is ended while holding the progress degree of the personal mission, that is, since a progress situation can be carried over at the time of the end, it is possible to play freely the multi-play without making it difficult to end the multi-play until the mission is accomplished.

Moreover, when forming a team with the same players again to play a virtual game in the multi-player mode, even if the progress degrees of the personal missions of other players that were progressed in the multi-play mode last time have been erased, except for a team mission, it is possible to play in the multi-play mode from the last continuation by integrating the progress degrees again.

Furthermore, since there is a team mission with great reward but unable to hold in addition to the personal missions of the respective players, it is possible to make generation or accomplishment of the team mission a goal at the time of the multi-play.

Figure 10:
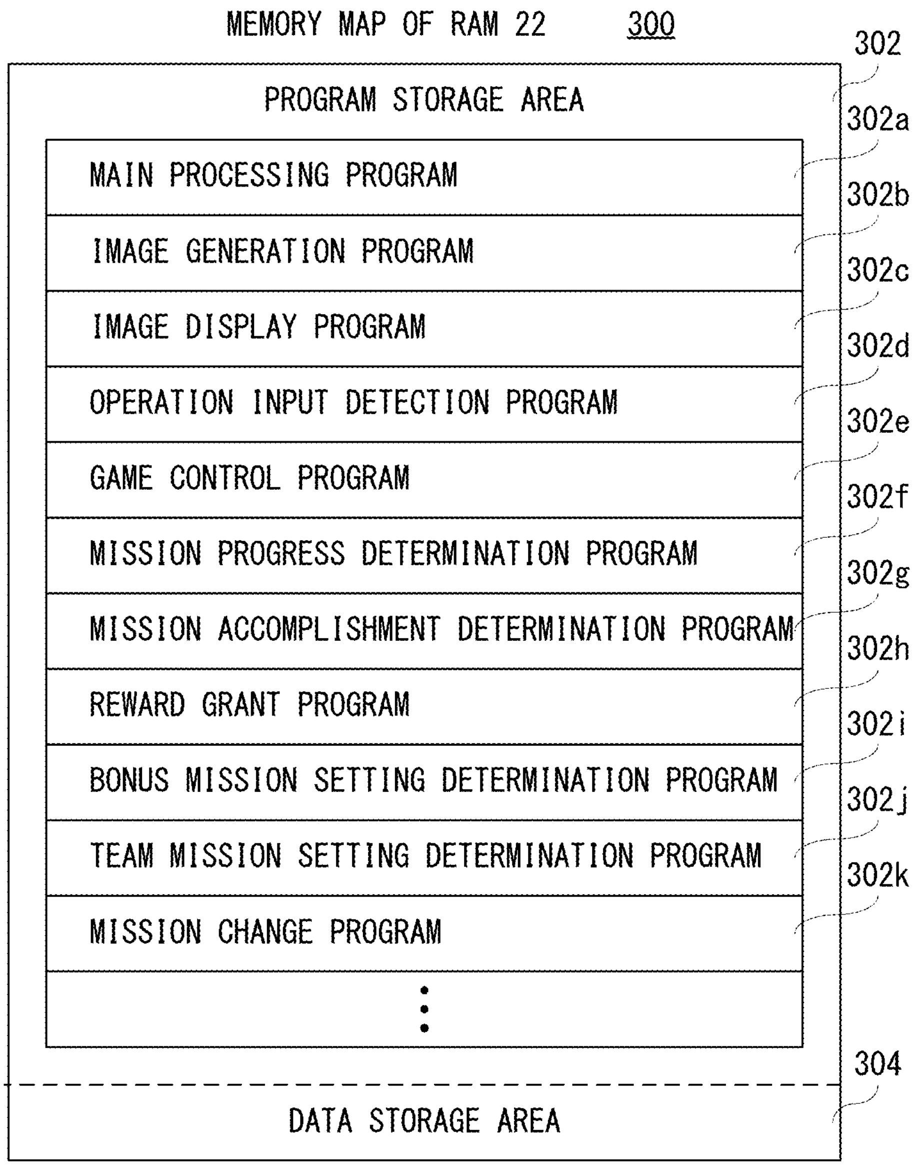
FIG. 10 is a view showing a non-limiting example memory map of a RAM incorporated in the game apparatus shown in FIG. 1.

Next, information processing according to an information processing apparatus will be described in detail. FIG. 10 is a view showing a non-limiting example memory map 300 of the RAM 22 of the game apparatus 10 shown in FIG. 1, i.e., the game apparatus 10 of the payer A. As shown in FIG. 10, the RAM 22 includes a program storage area 302 and a data storage area 304. The program storage area 302 is stored with an application program of a virtual game (i.e., game program) according to this embodiment, which is an example of an information processing program. The game program includes a main processing program 302*a*, an image generation program 302*b*, an image display program 302*c*, an operation input detection program 302*d*, a game control program 302*e*, a mission progress determination program 302*f*, a mission accomplishment determination program 302*g*, a reward grant program 302*h*, a bonus mission setting determination program 302*i*, a team mission setting determination program 302*j*, a mission change program 302*k*, etc.

In addition, the information processing program may be stored in advance in the flash memory 24, or may be acquired from an external server or another game apparatus 10 via a network such as Internet 2. Moreover, the information processing program may be acquired from an external memory attachable to or detachable from the game apparatus 10, such an optical disk, a USB memory or a memory card. However, a part of the information processing program is stored in the flash memory 24, and other parts thereof may be acquired from the external server, other game apparatus 10 or the external memory. These also apply to the image generation data 304*b* described later.

However, a function of displaying images such as a game image is a function that the game apparatus 10 itself is provided with. Therefore, the image display program 302*c* is not included in the game program.

The main processing program 302*a* is a program for processing a main routine of the game program of the embodiment. The image generation program 302*b* is a program for generating, using the image generation data 304*b*, game image data corresponding to various kinds of screens. The image display program 302*c* is a program for outputting the game image data generated according to the image generation program 302*b* to the display device 30. Therefore, various kinds of screens, such as the game screen 100, i.e., game image are displayed on the display device 30.

The operation input detection program 302*d* is a program for detecting operation input data 304*a* with respect to an operation input portion by the player. In the embodiment, the operation input portion includes various kinds of push buttons, keys or switches provided on the input device 28.

The game control program 302*e* is a program for executing game control processing of the virtual game of the embodiment. Specifically, game control processing in the solo-play mode (hereinafter, referred to as "solo-play game control processing") and game control processing in the multi-play mode (hereinafter, referred to as "multi-play game control processing") are executable.

The mission progress determination program 302*f* is a program for determining whether a progress condition of a mission is satisfied, and updating the progress degree of the mission that satisfies the progress condition. The mission progress determination program 302*f* is a program for determining, in the solo-play mode, whether a progress condition of a personal mission of the payer is satisfied, and updating the progress degree of the personal mission that satisfies the progress condition. However, the progress degree of the personal mission not satisfying the progress condition is not updated. The mission progress determination program 302*f* is a program for determining, in the multi-play mode, whether a progress condition of each mission included in the owned missions of the payer is satisfied, and updating the progress degree of the mission that satisfies the progress condition. However, the progress degree of the mission not satisfying the progress condition is not updated.

The mission accomplishment determination program 302*g* is a program for determining whether the accomplishment condition of the mission is satisfied. The mission accomplishment determination program 302*g* is a program for determining, in the solo-play mode, whether the accomplishment condition of a personal mission is satisfied. The mission accomplishment determination program 302*g* is a program for determining, in the multi-play mode, whether the accomplishment condition of each mission included in the owned missions is satisfied.

The reward grant program 302*h* is a program for granting a reward that is set to the mission satisfying the accomplishment condition to the player.

The bonus mission setting determination program 302*i* is a program for determining whether a bonus mission is to be set based on the first number of accomplishment times of the normal mission.

The team mission setting determination program 302*j* is a program for determining, in the multi-play mode, whether a team mission is to be set based on the second number of accomplishment times of the bonus mission.

The mission change program 302*k* is a program for changing the normal mission of themselves (i.e., player itself) or the bonus mission of themselves that is selected according to an operation of the player.

Although illustration is omitted, the program storage area 302 is further stored with other programs, such as a communication program for communicating with other game apparatuses 10, a sound output program for generating and outputting a sound required in the virtual game, a program for integrating respective progress degrees of the missions of the owned missions of themselves with the progress degrees of the missions of the owned missions of others, a program for changing a direction of the virtual camera according to an operation of the player, etc.

Figure 11:
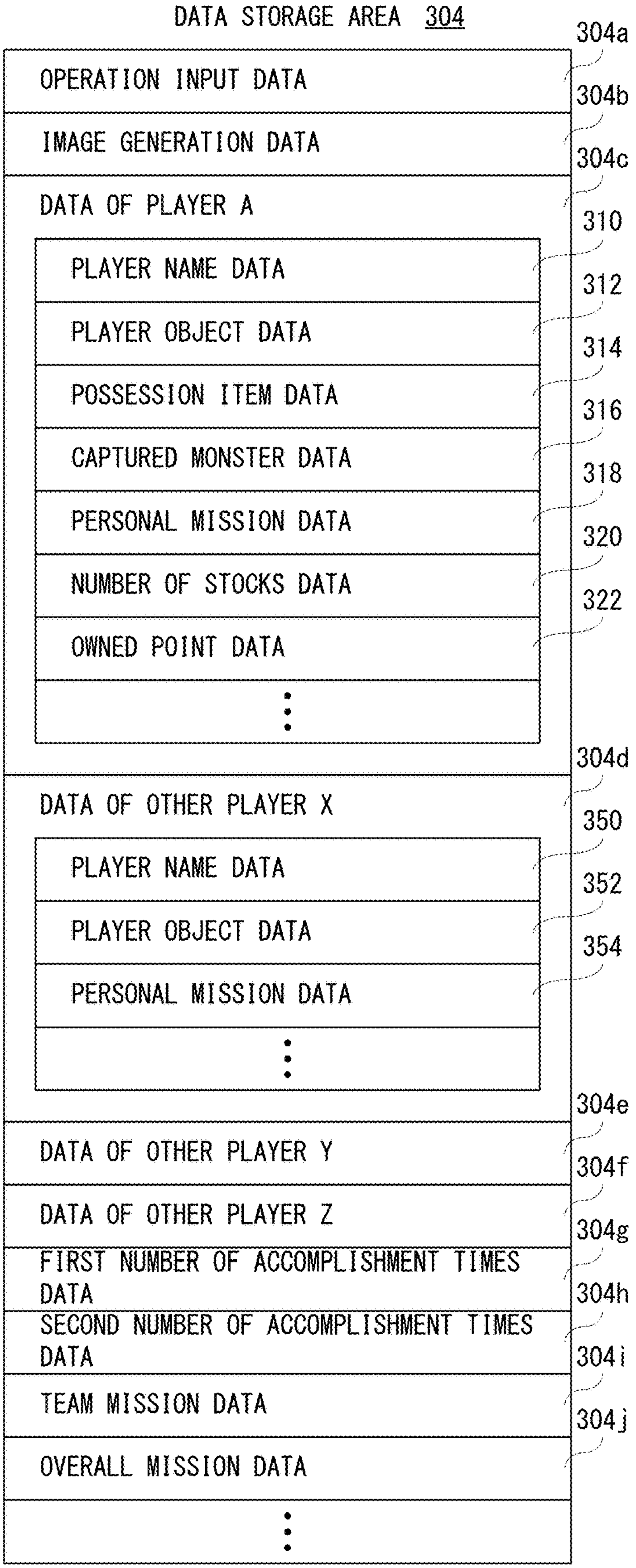
FIG. 11 is a view showing non-limiting example specific contents of a data storage area of the RAM shown in FIG. 10.

FIG. 11 is a view showing non-limiting example specific contents of the data storage area 304 of the RAM 22 shown in FIG. 10. As shown in FIG. 11, the data storage area 304 is stored with the operation input data 304*a*, the image generation data 304*b*, player A data 304*c*, other player X data 304*d*, other player Y data 304*e*, other player Z data 304*f*, the first number of accomplishment times data 304*g*, the second number of accomplishment times data 304*h*, team mission data 304*i*, overall mission data 304*j*, etc.

The operation input data 304*a* is data that is input from the input device 28, and is stored according to a time series. The operation input data 304*a* is eliminated if used for processing by the processor 20.

The image generation data 304*b* includes data for generating the data of various kinds of screens, i.e., game image data, such as polygon data and texture data, etc.

The player A data 304*c* is data regarding the player A of the game apparatus 10, and includes player name data 310, player object data 312, possession item data 314, captured monster data 316, personal mission data 318, the number of stocks data 320, owned point data 322, etc.

The player name data 310 is data regarding a name of the player (in the embodiment, "player A") of the game apparatus 10.

The player object data 312 is data regarding the player object 102 in the virtual game, and includes a type of the player object 102, and a current position and a current direction of the player object 102 in the virtual space.

The possession item data 314 is data regarding a type(s) and the number of items possessed by the player object 102.

The captured monster data 316 is data regarding a type(s) and the number of the monster objects 104 captured by the player object 102.

The personal mission data 318 is data regarding a personal mission that the player A owns. The personal mission includes three normal missions, and one bonus mission may be further added thereto.

The number of stocks data 320 is data regarding the number of the stocks of the condition for addition of the bonus mission.

The owned point data 322 is data of an owned point of the player A.

The player X data 304*d* is data regarding other player X that plays in the multi-player mode, and includes player name data 350, player object data 352, personal mission data 354, etc. Since respective pieces of data are the same as those of the player A data 304*c* described above, a duplicate description will be omitted here.

The player Y data 304*e* is data regarding other players Y that plays the multi-play. Moreover, the player Z data 304*f* is data regarding other players Z that plays the multi-play.

Although details of the player Y data 304*e* and the player Z data 304*f* are omitted, they are the same as the player X data 304*d*. However, when the number of the players that play the multi-play is two persons, the player Y data 304*e* and the player Z data 304*f* are not stored. Similarly, when the number of the players that play the multi-play is three persons, the player Z data 304*f* is not stored.

The first number of accomplishment times data 304*g* is data regarding the number of accomplishment times that the normal mission out of the owned missions of the player or the player object 102 is accomplished, i.e., data regarding the first accomplishment times.

The second number of accomplishment times data 304*h* is data regarding the number of accomplishment times that the bonus mission out of the owned missions of the player or the player object 102 is accomplished, i.e., data regarding the second accomplishment times.

The team mission data 304*i* is data regarding a mission imposed on a team formed with a plurality of players that play in the multi-player mode or a plurality of player objects.

In addition, the personal mission data 318 of the player A, the personal mission data 354 of other player X, the personal mission data of other player Y, the personal mission data of other player Z and the team mission data 304*i* are corresponding to the data of the owned missions of the player A.

However, when the number of the players that form the team is three, other player Z data 304*f* is not stored in the data storage area 304 and is not included in the data of the owned missions of the player A. Moreover, when the number of the players that form the team is two, other player Y data 304*e* and other player Z data 304*f* are not stored in the data storage area 304 and are not included in the data of the owned missions of the player A.

The overall mission data 304*j* is data regarding all the missions currently prepared in the virtual game. However, identification information for identifying the normal mission, the bonus mission and the team mission, the content of the mission, the progress condition of the mission, the accomplishment condition of the mission and the reward are set in each of the missions.

Although illustration is omitted, the data storage area 304 is stored with other data required for the information processing of the virtual game such as data of player object control information received from other game apparatuses 10, and is provided with a counter(s) or a timer(s). For example, positions and directions of the respective non-player objects such as a monster object, the respective background objects and the virtual camera, in the virtual space are stored.

Figure 12:
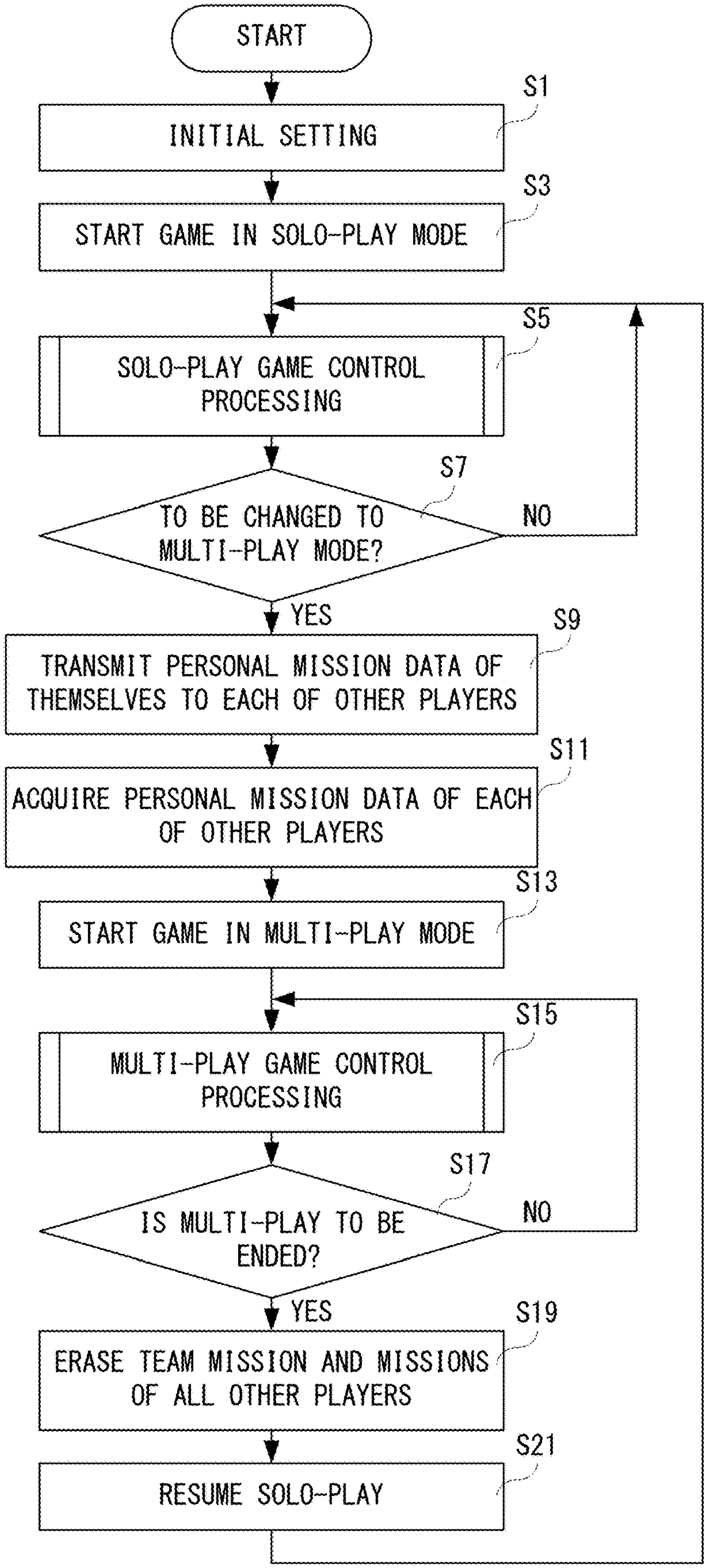
FIG. 12 is a flowchart showing non-limiting example overall processing of a virtual game by a processor incorporated in the game apparatus shown in FIG. 1.

FIG. 12 is a flowchart showing non-limiting example processing of the game program (overall processing) by the processor 20 shown in FIG. 1. FIG. 13-FIG. 16 are flowcharts showing non-limiting example solo-play game control processing by the processor 20 shown in FIG. 1. FIG. 17-FIG. 22 are flowcharts showing non-limiting example multi-play game control processing by the processor 20 shown in FIG. 1.

However, the processor 20 is the processor 20 of the game apparatus 10 of the player A. Moreover, processing of respective steps of the flowcharts shown in FIG. 12-FIG. 22 are mere examples, and if the same or similar result is obtainable, an order of the respective steps may be exchanged. Moreover, in the embodiment, it will be described that the processing of the respective steps of the flowcharts shown in FIG. 12-FIG. 22 are basically executed by the processor 20; however, some steps may be executed by a processor(s) and/or a dedicated circuit(s) other than the processor 20.

In the following, the overall processing by the processor 20 of the game apparatus 10 of the player A, the solo-play game control processing and the multi-play game control processing will be described with reference to FIG. 12-FIG. 22, but duplicated descriptions will be omitted on the same content of processing.

Although illustration and a description are omitted, the processor 20 of each of the game apparatuses 10 of other players (here, players X, Y and Z) similarly executes the overall processing, the solo-play game control processing and the multi-play game control processing. In addition, the players A, Y and Z are other players for the player X, the players A, X and Z are other players for the player Y, and the players A, X and Y are other players for the player Z.

When the power supply of the game apparatus 10 is turned on, prior to execution of the overall processing, the processor 20 executes a boot program stored in a boot ROM not shown, whereby respective units including the RAM 22, etc. are initialized. The game apparatus 10 will start the overall processing if execution of the game program according to the embodiment is instructed by the player A.

As shown in FIG. 12, if the overall processing is started, the processor 20 executes initial setting in a step S1. Here, the processor 20 determines positions and directions that the player object 102, respective non-player objects (including the monster object 104), respective background objects and the virtual camera are to be arranged to initial positions and initial directions, in the virtual space. Moreover, the processor 20 sets a personal mission (here, three normal missions) by drawing lots to the player A.

However, when the virtual game is started from the continuation last time, the processor 20 determines the positions and the directions that the player object 102, the respective non-player objects, the respective background objects and the virtual camera are to be arranged to positions and directions at the time of saving, in the virtual space. Moreover, the processor 20 determines the personal mission at the time of saving. However, a bonus mission may be added to the personal mission at the time of saving.

Therefore, the player object data 312 that the data of the initial position and the data of the initial direction of the player object 102 or the data of the position and the data of the direction of the player object 102 at the time of saving are set as the data of the current position and the data of the current direction is stored in the data storage area 304. Similarly, the data that the data of the initial positions and the data of the initial directions of the respective non-player objects, the respective background objects and the virtual camera in the virtual space or the data of the positions and the data of the directions of the respective non-player objects, the respective background objects and the virtual camera in the virtual space at the time of saving are set as the data of the current positions and the data of the current directions are stored in the data storage area 304. Moreover, the personal mission data 318 determined as the data of the personal mission set to the player A or the personal mission at the time of saving is stored in the data storage area 304.

In addition, since a game is started by the solo-play mode in this embodiment, the data regarding other players (in the embodiment, 304*d*, 304*e* and 304*f*) is not stored in the data storage area 304 until the data of the personal missions of other players are acquired when a game is to be started in the multi-player mode. Similarly, the team mission data 304*i* that is added during the game of the multi-play is also not stored in the data storage area 304. Moreover, during the game in the solo-play, the second number of accomplishment times data 304*h* is not updated.

A virtual game is started in the solo-play mode in a subsequent step S3, and in a step S5, the solo-play game control processing (FIG. 13-FIG. 16 described later) is executed, and then, it is determined, in a step S7, whether the solo-play mode is to be transferred to the multi-play mode. Here, other players are invited according to an operation of the player A, in response thereto, entry requests from the game apparatuses 10 of other players are accepted, and a connection state with the game apparatuses of other players 10 is established, and it is determined whether a team is formed. Otherwise, the game apparatus 10 of the player A transmits an entry request to invitation from the game apparatus 10 according to an operation of the player A to the game apparatus 10 of other players, and establishes connection state with the game apparatuses 10 of other players, and determines whether a team is formed.

If "NO" is determined in the step S7, that is, if the solo-play mode is not to be transferred to the multi-play mode, the process returns to the step S5. On the other hand, if "YES" is determined in the step S7, that is, if the solo-play mode is to be transferred to the multi-play mode, in a step S9, the personal mission of the player is transmitted to each of the game apparatuses 10 of other players forming a team. In a next step S11, the personal mission of each of other players of the team is acquired.

Subsequently, the virtual game in the multi-play mode is started in a step S13, and the multi-play game control processing (FIGS. 17-22 described later) is executed in a step S15, and it is determined, in a step S17, whether the multi-play is to be ended. Here, the processor 20 determines whether an end of the multi-play is instructed by the player A, whether it is notified from the game apparatus 10 of other player X, Y or Z that the multi-player mode is to be ended, or whether the connection state with the game apparatus 10 of other player X, Y or Z is canceled.

If "NO" is determined in the step S17, that is, if it is not an end of the multi-play, the process returns to the step S15. On the other hand, if "YES" is determined in the step S17, that is, if it is an end of the multi-play, in a step S19, the team mission and the personal missions of other players are erased, and the virtual game in the solo-play mode is resumed in a step S21, and the process returns to the step S5.

In addition, as described later, if an end of the virtual game is instructed when the virtual game is being executed in the solo-play mode, the virtual game in the solo-play mode is ended, and further the overall processing is also ended.

Figure 13:
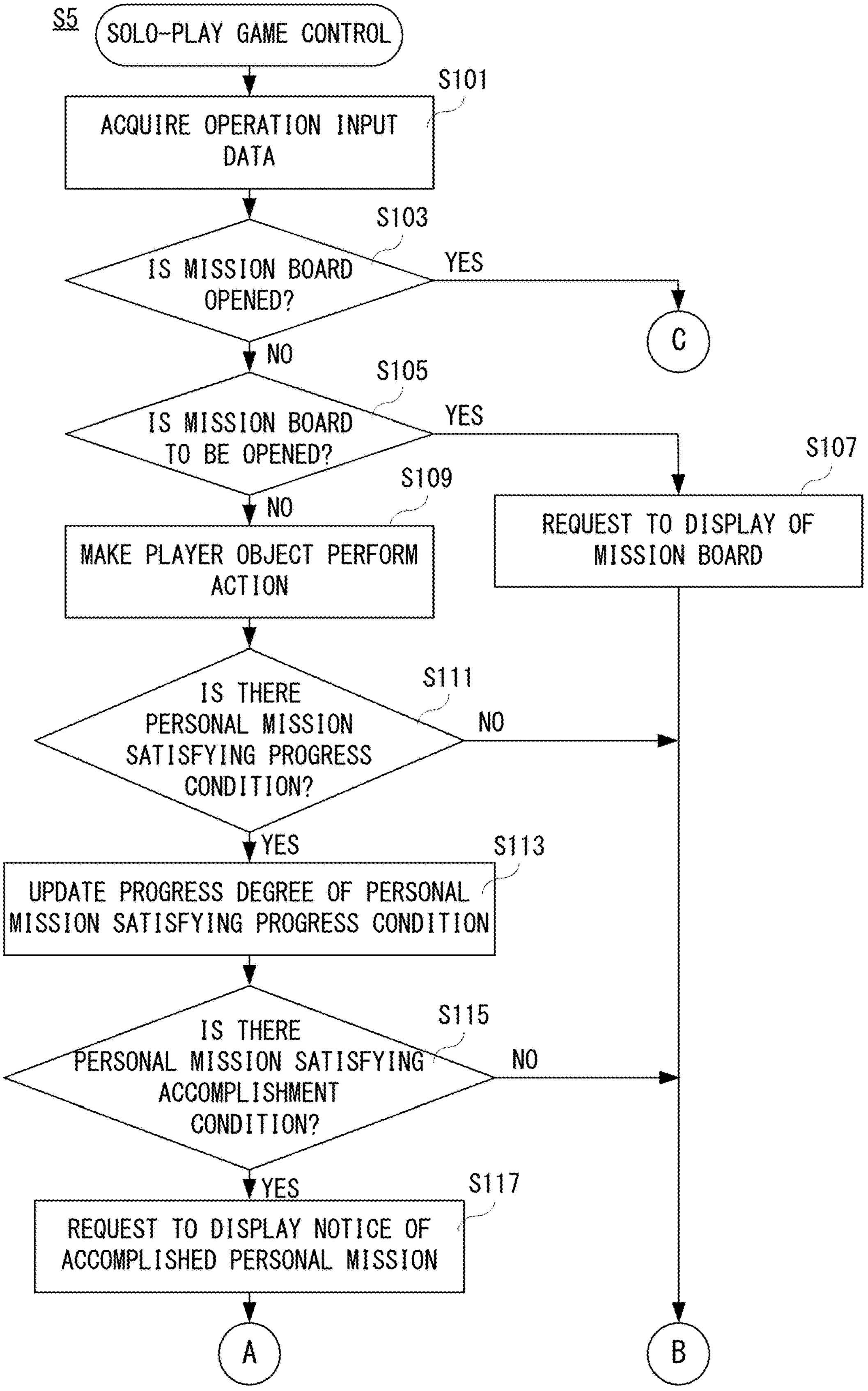
FIG. 13 is a flowchart showing a first part of non-limiting example solo-play game control processing by the processor incorporated in the game apparatus shown in FIG. 1.

As shown in FIG. 13, if the solo-play game control processing is started, the processor 20 acquires, in a step S101, the operation input data 304*a* that is input or transmitted from the input device 28. In a next step S103, it is determined whether the mission board 110 is opened.

Figure 16:
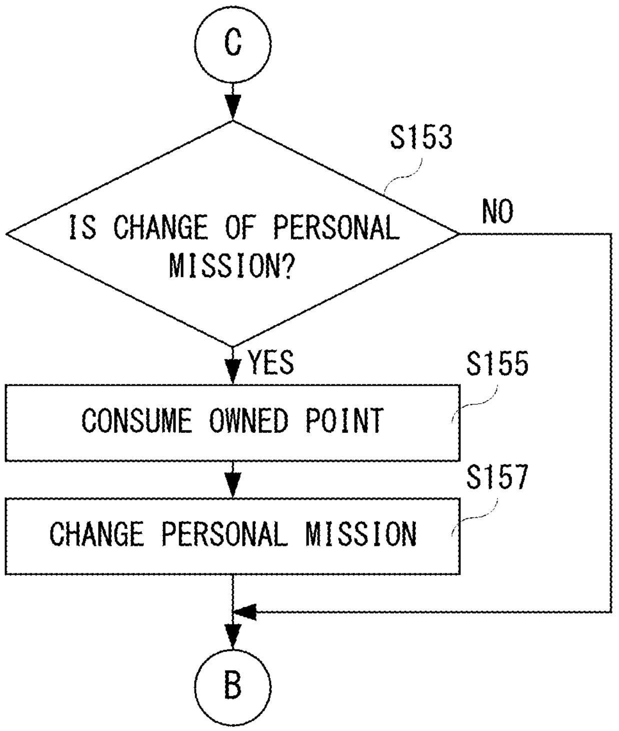
FIG. 16 is a flowchart showing a fourth part of the non-limiting example solo-play game control processing by the processor incorporated in the game apparatus shown in FIG. 1, following FIG. 13.

If "YES" is determined in the step S103, that is, if the mission board 110 is opened, the process proceeds to a step S153 shown in FIG. 16. On the other hand, if "NO" is determined in the step S103, that is, if the mission board 110 is not opened, it is determined, in a step S105, whether the mission board 110 is to be opened. In this step S105, the processor 20 determines whether the operation input data 304*a* detected in the step S101 is an instruction to open the mission board 110.

Figure 14:
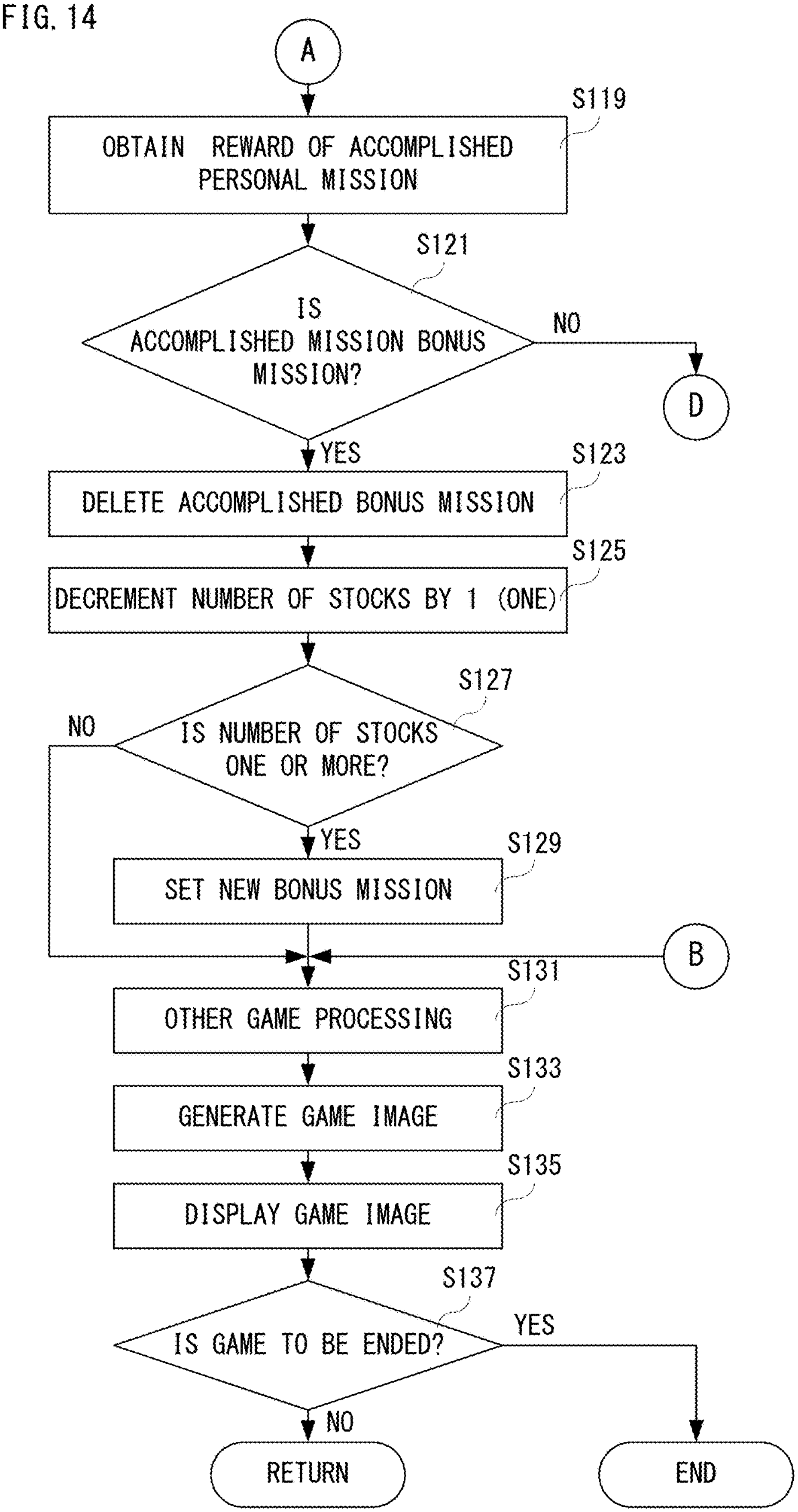
FIG. 14 is a flowchart showing a second part of the non-limiting example solo-play game control processing by the processor incorporated in the game apparatus shown in FIG. 1, following FIG. 13.

If "YES" is determined in the step S105, that is, if the mission board 110 is to be opened, in a step S107, the processor 20 requests to display the mission board 110 to the image generation portion (step S133), and the process proceeds to a step S131 shown in FIG. 14. Therefore, when generating a game image in the step S133, the image of the mission board 110 is also generated. In the following, this applies to a case where a display is requested to an image generation portion.

On the other hand, if "NO" is determined in the step S105, that is, if the mission board 110 is not to be opened, the processor 20 makes the player object 102 perform an action according to the operation input data 304*a* in a step S109.

In a next step S111, it is determined whether there is any personal mission that satisfies the progress condition. If "NO" is determined in the step S111, that is, if there is no personal mission that satisfies the progress condition, the process proceeds to the step S131. On the other hand, if "YES" is determined in the step S111, that is, if there is a personal mission that satisfies the progress condition, in a step S113, the progress degree of the personal mission that satisfies the progress condition in the personal mission data 318 is updated.

Subsequently, in a step S115, it is determined whether there is any personal mission that satisfies the accomplishment condition. That is, the processor 20 determines whether there is any personal mission that the progress degree reaches the accomplishment condition.

If "NO" is determined in the step S115, that is, if there is no personal mission that satisfies the accomplishment condition, the process proceeds to the step S131. On the other hand, if "YES" is determined in the step S115, that is, if there is a personal mission that satisfies the accomplishment condition, a display of a notice of the accomplished personal mission is requested to the image generation portion (step S133) in a step S117, and a reward for the accomplished personal mission is granted in a step S119 shown in FIG. 14. That is, the point that is set to the accomplished personal mission is added to the owned point, and the owned point data 322 is updated.

In a next step S121, it is determined whether the accomplished mission is a bonus mission. If "NO" is determined in the step S121, that is, if the accomplished mission is a normal mission, the process proceeds to a step S139 shown in FIG. 15. On the other hand, if "YES" is determined in the step S121, that is, if the accomplished mission is a bonus mission, the accomplished bonus mission is deleted in a step S123, and the number of the stocks is decremented by 1 (one) in a step S125. At this time, the first number of accomplishment times of the normal mission is decremented by 10 (ten).

In a subsequent step S127, it is determined whether the number of the stocks is one or more. If "NO" is determined in the step S127, that is, if the number of the stocks is 0 (zero), the process proceeds to the step S131. On the other hand, if "YES" is determined in the step S127, that is, if the number of the stocks is one or more, a new bonus mission is set in a step S129. Here, the processor 20 draws lots a bonus mission out of all the mission data 304*j* except the bonus mission deleted in the step S123, and sets the bonus mission that is drawn lots to the player A. This is also applying to a case where a personal mission is set to the player A.

Subsequently, other game processing is executed in the step S131. In other game processing, the processor 20 makes the non-player object including the monster object 104 perform an action, or arranges an item in the virtual space. Moreover, according to an operation of the player A, the processor 20 moves a cursor on the mission board 110, selects the mission UI image 130 or 140 or cancels a selected state the mission UI image 130 or 140, displays the menu window 150, and makes the mission board 110 be hidden.

In a next step S133, the game image is generated, and the game image is displayed in a step S135, and in a step S137, it is determined whether the game is to be ended. In the step S137, the processor 20 determines whether an end of the game is instructed by the player A. If "NO" is determined in the step S137, that is, if it is not an end of the game, the process returns to the overall processing. On the other hand, if "YES" is determined in the step S137, that is, if it is an end of the game, the overall processing is terminated.

Figure 15:
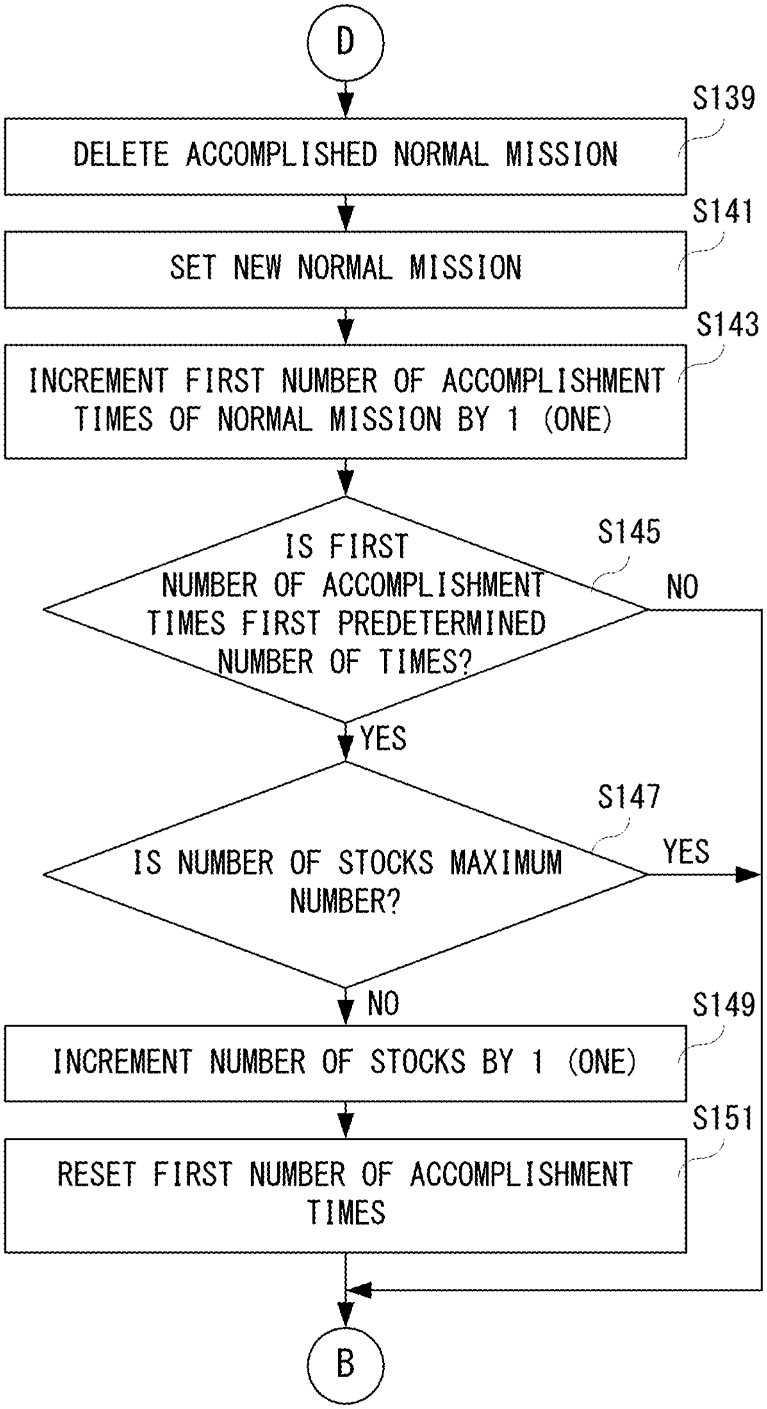
FIG. 15 is a flowchart showing a third part of the non-limiting example solo-play game control processing by the processor incorporated in the game apparatus shown in FIG. 1, following FIG. 14.

As described above, if "NO" is determined in the step S121, the accomplished normal mission is deleted in a step S139 shown in FIG. 15, and a new normal mission is set in a step S141, and the first number of accomplishment times of the normal mission is incremented by 1 (one) in a step S143. That is, the first number of accomplishment times corresponding to the first number of accomplishment times data 304*g* is incremented by 1 (one).

In a next step S145, it is determined whether the first number of accomplishment times is the first predetermined number of times (in the embodiment, 10 (ten)). If "NO" is determined in the step S145, that is, if the first number of accomplishment times is not the first predetermined number of times, the process proceeds to the step S131 shown in FIG. 14. On the other hand, if "YES" is determined in the step S145, that is, if the first number of accomplishment times is the first predetermined number of times, it is determined, in a step S147, whether the number of the stocks is the maximum value (in the embodiment, 3 (three)) in a step S147.

If "YES" is determined in the step S147, that is, if the number of the stocks is the maximum value, the process proceeds to the step S131. On the other hand, if "NO" is determined in the step S147, that is, if the number of the stocks is not the maximum value, the number of the stocks is incremented by 1 (one) in a step S149, and in a step S151, the first number of accomplishment times is reset, and then, the process proceeds to the step S131.

Moreover, as described above, if "YES" is determined in the step S103, it is determined, in the step S153 shown in FIG. 16, whether it is a change of a personal mission. Here, the processor 20 determines whether a change of a personal mission is selected in the menu window 150.

If "NO" is determined in the step S153, that is, if it is not a change of a personal mission, the process proceeds to the step S131. On the other hand, if "YES" is determined in the step S153, that is, if it is a change of a personal mission, the owned point is consumed in a step S155, and the selected personal mission is changed in a step S157, and then, the process proceeds to the step S131. In the embodiment, in the step S155, the processor 20 subtracts from the owned point half of the reward that is to be granted when the personal mission that is instructed to be changed is accomplished.

Figure 17:
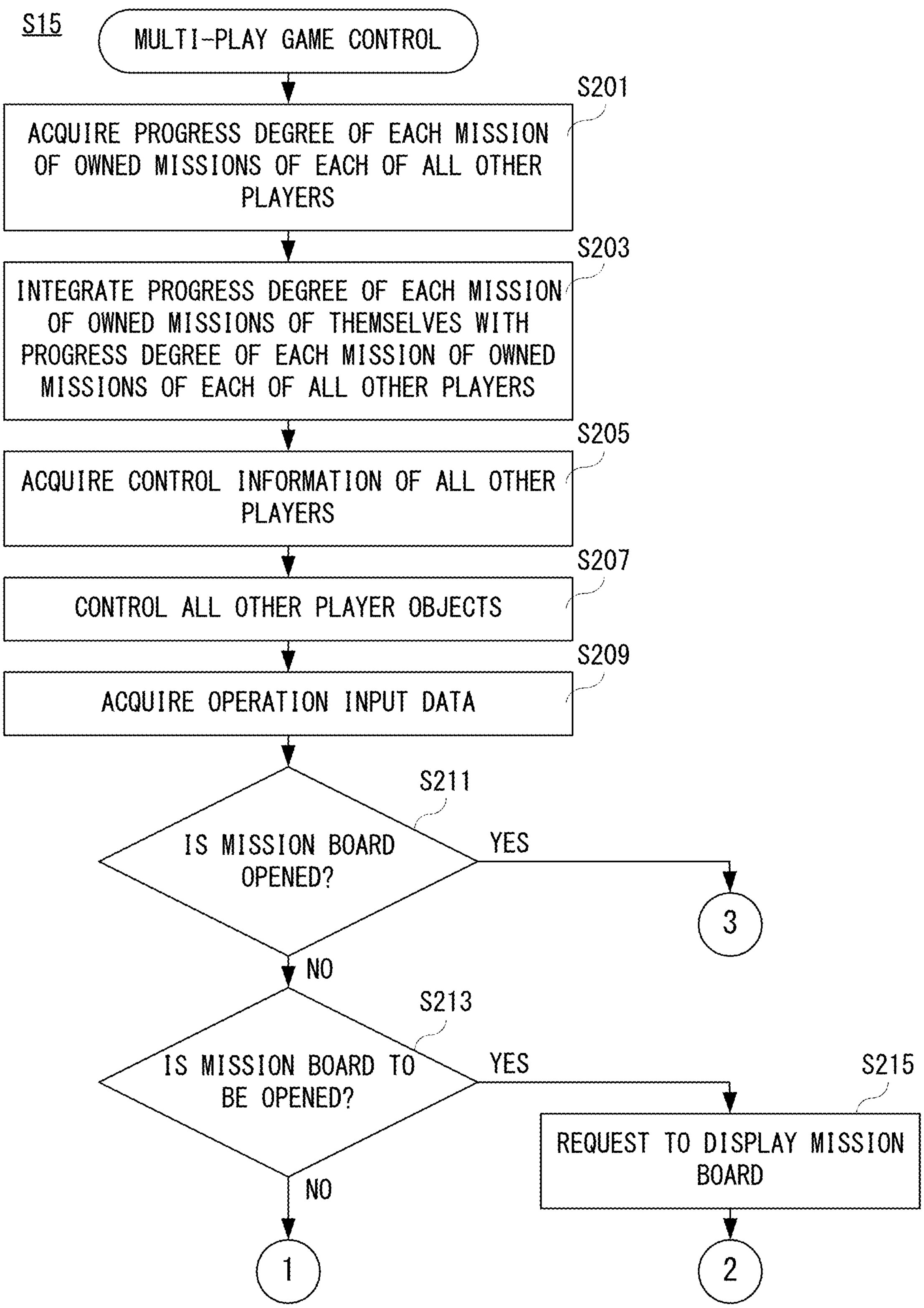
FIG. 17 is a flowchart showing a first part of non-limiting example multi-play game control processing by the processor incorporated in the game apparatus shown in FIG. 1.
Figure 18:
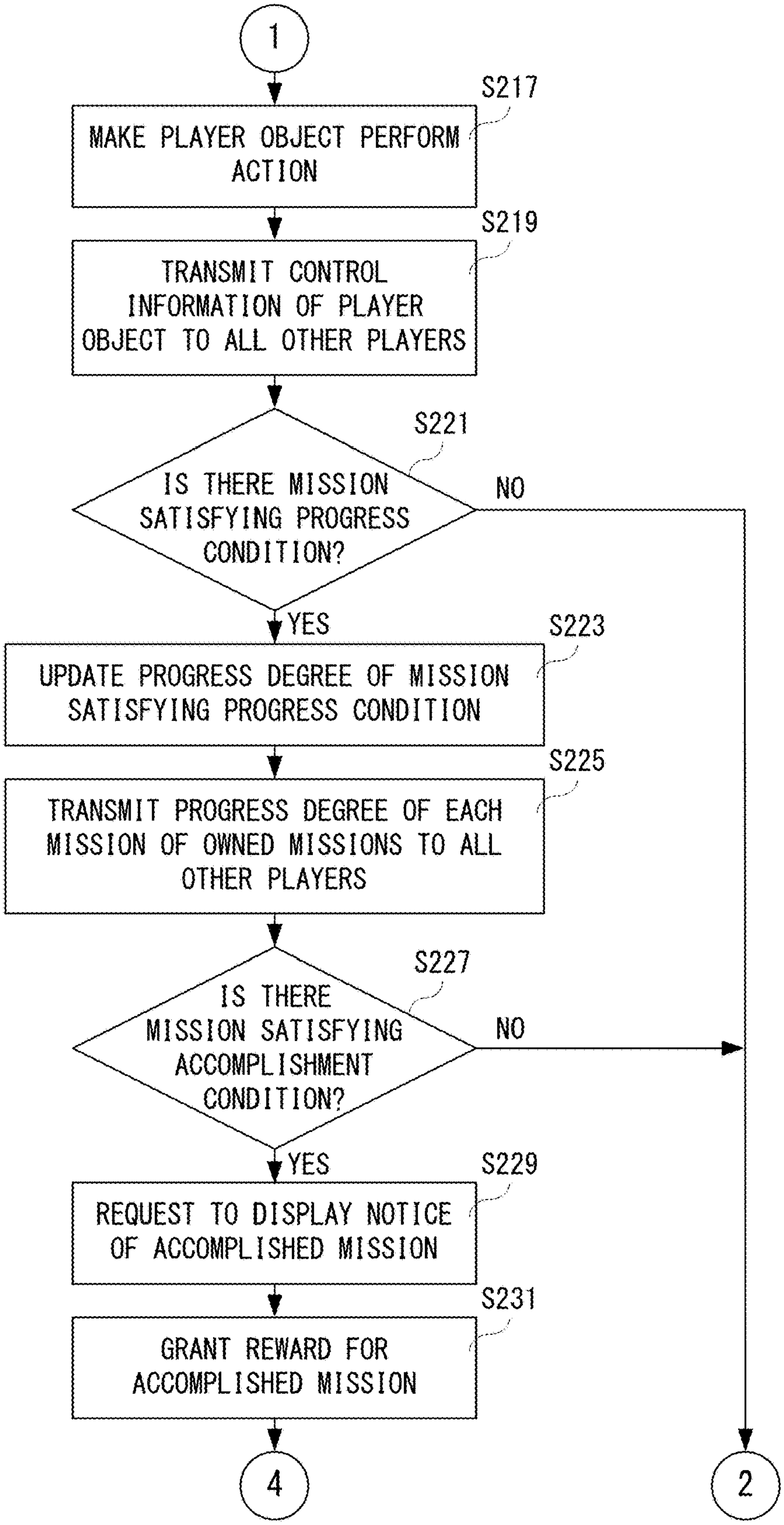
FIG. 18 is a flowchart showing a second part of non-limiting example multi-play game control processing by the processor incorporated in the game apparatus shown in FIG. 1, following FIG. 17.

As shown in FIG. 17, when the multi-player game control processing is started, the processor 20 acquires the progress degrees of the respective missions included in the owned missions of all other players (here, other players X, Y and Z) in a step S201, and in a step S203, the processor 20 integrates the progress degrees of the respective missions included in the owned missions of themselves with the progress degrees of the respective missions included in the owned missions of all other players (here, other players X, Y and Z). The method of integration is as described above. Moreover, as described above, the processor 20 updates suitably at this time the first number of accomplishment times and the second number of accomplishment times.

In a next step S205, all other player object control information are acquired, and in a step S207, all other player objects are controlled according to other player object control information acquired in the step S205, and the operation input data 304*a* that is input or transmitted from the input device 28 is acquired in a step S209.

In addition, according to the positions and the directions of other player objects included in other player object control information acquired in the step S205, the data of the current position and the data of the current direction out of the player object data 352 included in the data of other player X 304*d* are updated, the data of the current position and the data of the current direction out of the player object data included in the other player Y data 304*e* are updated, and the data of the current position and the data of the current direction out of the player object data included in the other player Z data 304*f* are updated.

Subsequently, it is determined, in a step S211, whether the mission board 110 is being opened. If "YES" is determined in the step S211, the process proceeds to a step S285 shown in FIG. 22. On the other hand, if "NO" is determined in the step S211, it is determined, in a step S213, whether the mission board 110 is to be opened.

Figure 21:
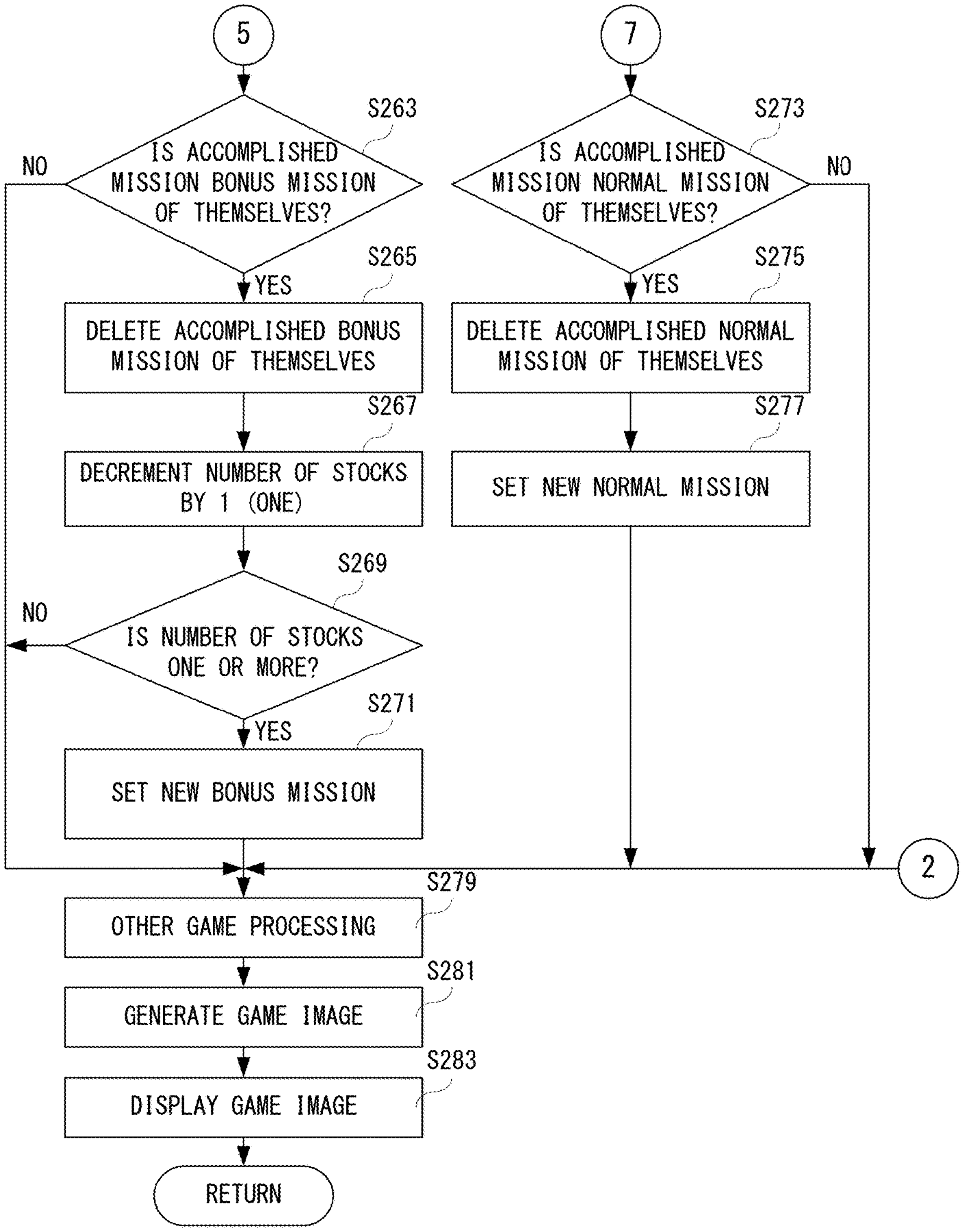
FIG. 21 is a flowchart showing a fifth part of non-limiting example multi-play game control processing by the processor incorporated in the game apparatus shown in FIG. 1, following FIG. 19 and FIG. 20.

If "YES" is determined in the step S213, in a step S215, it is requested to display the mission board 110 to the image generation portion (step S281), and the process proceeds to a step S279 shown in FIG. 21. On the other hand, if "NO" is determined in the step S213, in a step S217 shown in FIG. 18, the player object 102 is made to be performed an action according to the operation input data 304*a*, and in a step S219, the information of the position, the direction and the action of the player object 102, i.e., the player object control information are transmitted to each of the game apparatuses 10 of other players.

In a subsequent step S221, it is determined whether there is a mission that satisfies the progress condition out of the owned missions. If "NO" is determined in the step S221, that is, if there is no mission that satisfies the progress condition, the process proceeds to a step S279. On the other hand, if "YES" is determined in the step S221, that is, if there is a mission that satisfies the progress condition, the progress degree of the mission that satisfies the progress condition is updated in a step S223, and in a step S225, the progress degree of each mission included in the owned missions of the player A is transmitted to all of the game apparatuses 10 of other players.

Subsequently, in a step S227, it is determined whether there is a mission that satisfies the accomplishment condition out of the owned missions. If "NO" is determined in the step S227, that is, if there is no mission satisfying the accomplishment condition, the process proceeds to the step S279. On the other hand, if "YES" is determined in the step S227, that is, if there is a mission satisfying the accomplishment condition, it is requested to notify the accomplished mission to the image generation portion in a step S229, and in a step S231, a reward for the accomplished mission is granted to the player A.

Figure 19:
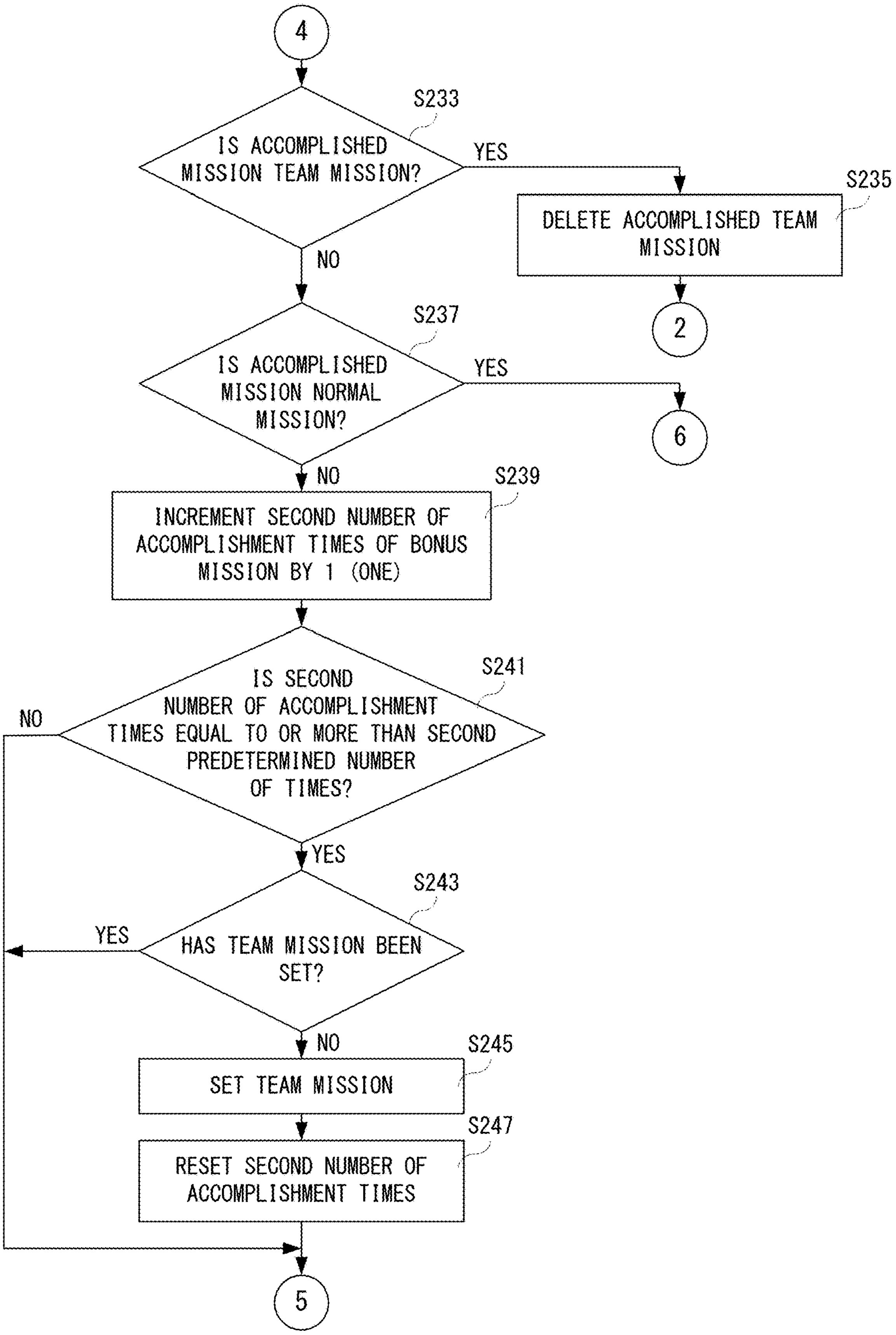
FIG. 19 is a flowchart showing a third part of non-limiting example multi-play game control processing by the processor incorporated in the game apparatus shown in FIG. 1, following FIG. 18.

As shown in FIG. 19, in a subsequent step S233, it is determined whether the accomplished mission is a team mission. If "YES" is determined in the step S233, that is, if the accomplished mission is a team mission, the accomplished team mission is deleted in a step S235, and the process proceeds to the step S279.

On the other hand, if "NO" is determined in the step S233, that is, if the accomplished mission is not a team mission, it is determined, in a step S237, whether the accomplished mission is a normal mission. If "YES" is determined in the step S237, that is, if the accomplished mission is a normal mission, the process proceeds to a step S249 shown in FIG. 20.

On the other hand, if "NO" is determined in the step S237, that is, if the accomplished mission is a bonus mission, the second number of accomplishment times of a bonus mission is incremented by 1 (one) in a step S239.

In a subsequent step S241, it is determined whether the second number of accomplishment times is equal to or more than the second predetermined number of times. If "NO" is determined in the step S241, that is, if the second number of accomplishment times is less than the second predetermined number of times, the process proceeds to a step S263 shown in FIG. 21. On the other hand, if "YES" is determined in the step S241, that is, if the second number of accomplishment times is equal to or more than the second predetermined number of times, it is determined, in a step S243, whether a team mission has been already set.

If "YES" is determined in the step S243, that is, if a team mission has been already set, the process proceeds to the step S263. On the other hand, if "NO" is determined in the step S243, that is, if a team mission has not been set, a team mission is set in a step S245, and the second number of accomplishment times is reset in a step S247, and the process proceeds to the step S263.

Figure 20:
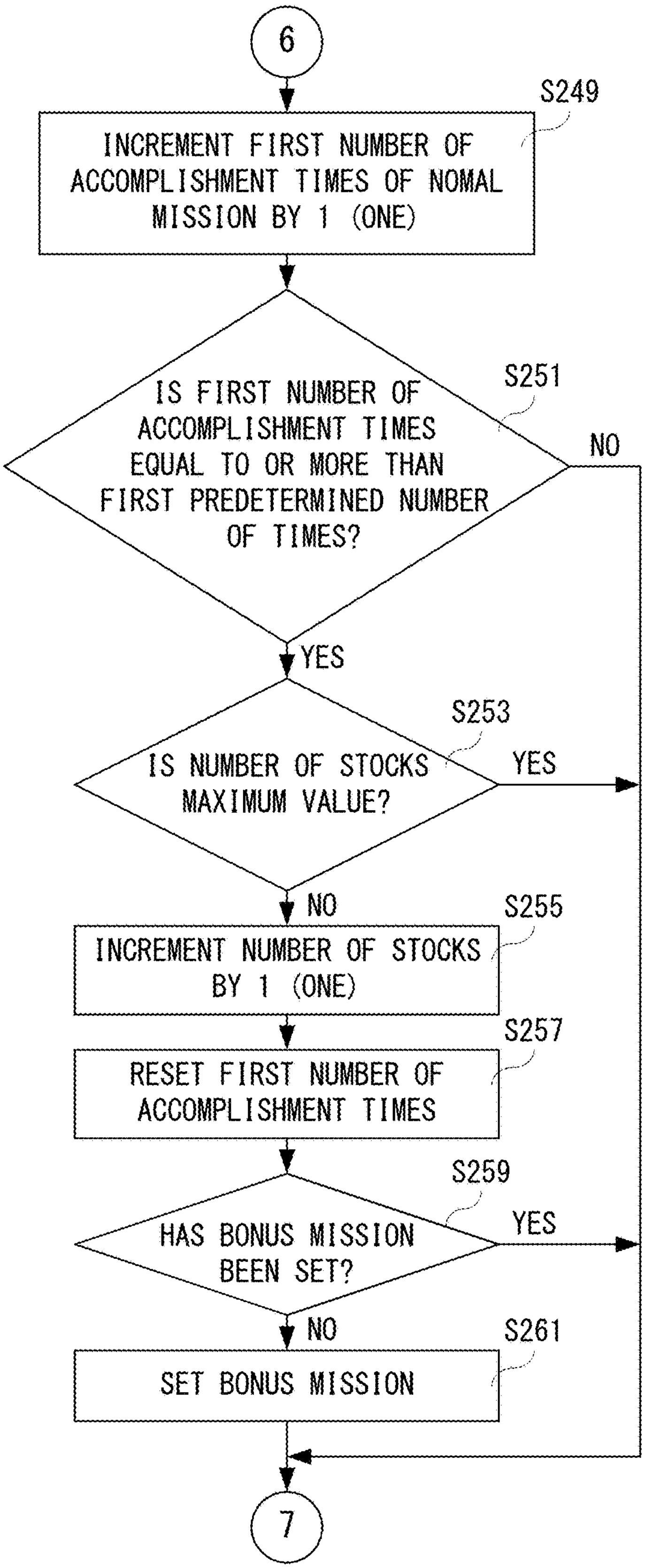
FIG. 20 is a flowchart showing a fourth part of non-limiting example multi-play game control processing by the processor incorporated in the game apparatus shown in FIG. 1, following FIG. 19.

As described above, if "YES" is determined in the step S237, the first number of accomplishment times of a normal mission is incremented by 1 (one) in a step S249 shown in FIG. 20. In a next step S251, it is determined whether the first number of accomplishment times is equal to or more than the first predetermined number of times. If "NO" is determined in the step S251, that is, if the first number of accomplishment times is less than the first predetermined number of times, the process proceeds to a step S273 shown in FIG. 21. On the other hand, if "YES" is determined in the step S251, that is, if the first number of accomplishment times is equal to or more than the first predetermined number of times, it is determined whether the number of the stocks is the maximum value in a step S253.

If "YES" is determined in the step S253, the process proceeds to a step S273. On the other hand, if "NO" is determined in the step S253, the number of the stocks is incremented by 1 (one) in a step S255, and in a step S257, the first number of accomplishment times is reset, and then, it is determined, in a step S259, whether a bonus mission has been already set.

If "YES" is determined in the step S259, that is, if a bonus mission has been already set, the process proceeds to the step S273. On the other hand, if "NO" is determined in the step S259, that is, if a bonus mission has not already been set, in a step S261, a bonus mission is set, and the progress proceeds to the step S273.

As shown in FIG. 21, in the step S263, it is determined whether the accomplished mission is a bonus mission of themselves. If "NO" is determined in the step S263, that is, if the accomplished mission is a bonus mission of other players, the process proceeds to the step S279. On the other hand, if "YES" is determined in the step S263, that is, if the accomplished mission is a bonus mission of themselves, the accomplished bonus mission of themselves is deleted in a step S265, and the number of the stocks is decremented by 1 (one) in a step S267.

In a next step S269, it is determined whether the number of the stocks is one or more. If "NO" is determined in the step S269, that is, if the number the stocks is 0 (zero), the process proceeds to the step S279. On the other hand, if "YES" is determined in the step S269, that is, if the number of the stocks is one or more, a new bonus mission is set in a step S271, and the process proceeds to the step S279.

Moreover, in a step S273, it is determined whether the accomplished mission is a normal mission of themselves. If "NO" is determined in the step S273, that is, if the accomplished mission is a normal mission of others, the process proceeds to the step S279. On the other hand, if "YES" is determined in the step S273, that is, if the accomplished mission is a normal mission of themselves, the accomplished normal mission of themselves is deleted in a step S275, and in a step S277, a new normal mission is set, and then, the process proceeds to the step S279.

In the step S279, other game processing is executed. In other game processing, the processor 20 makes the non-player object including the monster object 104 perform an action, or arranges an item in the virtual space. Moreover, according to an operation of the player A, the processor 20 moves a cursor on the mission board 110, scrolls the mission board 110, selects the mission UI image 130, 140 or 160 or cancels selected state for the mission UI image 130, 140 or 160, displays the menu window 150, or makes the mission board 110 be hidden. In a next step S281, the game image is generated, and the game image is displayed in a step S283, and then, the process returns to the overall processing.

Figure 22:
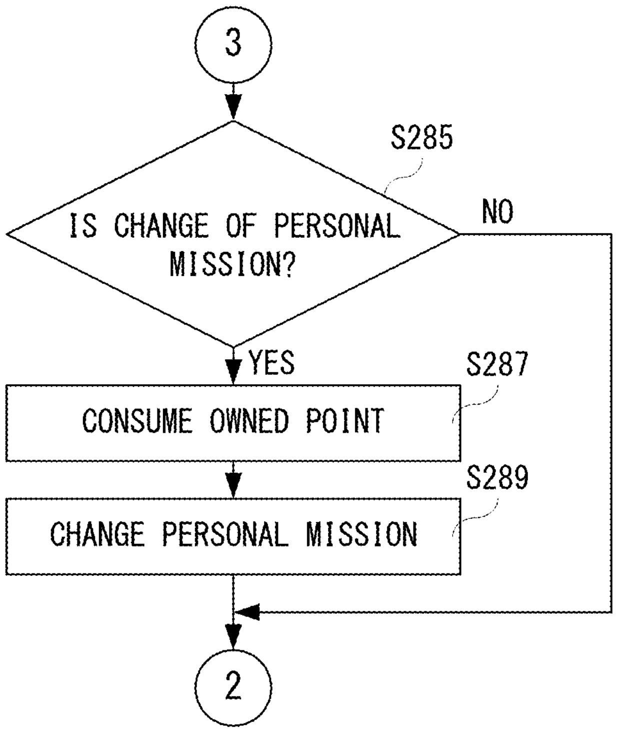
FIG. 22 is a flowchart showing a sixth part of non-limiting example multi-play game control processing by the processor incorporated in the game apparatus shown in FIG. 1, following FIG. 17.

Moreover, as described above, if "YES" is determined in the step S211, it is determined whether it is a change of a personal mission in a step S285 shown in FIG. 22. If "NO" is determined in the step S285, the process proceeds to the step S279. On the other hand, if "YES" is determined in the step S285, the owned point is consumed in a step S289, and in a step S289, the selected personal mission is changed, and then, the process proceeds to the step S279. However, what can be changed is a personal mission of themselves.

According to the embodiment, in the multi-play, it is possible to accomplish respective missions of the respective players in cooperation. It is possible to keep the progress degree of the mission of themselves even after ending the multi-play, whereby the mission of themselves can be further progressed in the solo-play. It is also possible to start a play of the game in the multi-play in a state that the mission of themselves is progressed in the solo-play. Therefore, it is possible to play freely the multi-play without being bounded by the progress degree.

In addition, in the embodiment, if any player leaves from the team in the multi-play mode, the virtual game is resumed in the solo-play mode, but it does not need to be limited to this. Even when other player(s) leave from the team, the virtual game in the multi-play mode may be continued with a plurality of remaining players. In such a case, the personal mission of other player left from the team is erased.

Moreover, in the embodiment, the bonus mission or the one normal mission that is specified among the personal missions can be changed, but all the personal missions may be changed at once.

Furthermore, in the embodiment, once a virtual game is started in the multi-play mode, no additional players are invited, so players cannot join in the middle of the virtual game. However, players may be allowed to join during the virtual game in multi-play game mode.

Moreover, in the embodiment, the overall processing of the virtual game, the solo-play game control processing and the multi-play game control processing shown in FIG. 12-FIG. 22 are all executed by the processor 20 of the game apparatus; however, a part or all of them may be executed by an external computer capable of communicating with the game apparatus so that the game apparatus may acquire from the computer a result(s) of the processing in part or all. In such a case, a network game system or an information processing system is constituted by the game apparatus and the external computer that is communicably connected with the game apparatus.

Furthermore, in the multi-play mode according to the embodiment, each mission included in the owned missions is progressed by each game apparatus 10 and the progress degree is individually transmitted to each of other game apparatuses 10, but it should not be limited. The type of each mission included in the owned missions is transmitted and received without transmitting and receiving the progress degree of each mission included in the owned missions, and each game apparatus 10 controls actions of other player objects according to the player object control information received from other game apparatuses 10, and the progress degree of each mission included in the owned missions may be updated base on the actions of other player objects. In such a case, it is transmitted and received to and from other game apparatuses 10 that the mission is accomplished, and when the accomplished mission is a personal mission, a new personal mission is set with the game apparatus 10 of the player that owns a personal mission.

Furthermore, in the multi-play mode according to the embodiment, a virtual game is played after establishing a connection state with a plurality of game apparatuses, but it should not be limited. A plurality of players may play a virtual game in the multi-play mode using a single game apparatus. In such a case, when playing a virtual game in the multi-play mode, the number of other players is determined, and thereafter, when the game apparatus recognizes the input devices, i.e., controllers used by the other players, the game apparatus reads the save data of other players and starts the virtual game in the multi-player mode. In this case, as for each of other players (e.g., players X, Y and Z) that join to the multi-play, as an example, the processing of the steps S201-S209 and the steps S217-S171 out of the multi-play game control while deleting the steps S211, S213 and S215 and S279-S289 are executed in parallel to the multi-play game control processing of the player A.

Furthermore, in the embodiment, the mission UI images corresponding to the missions are displayed vertically in the mission board, but should not be limited. The mission UI images corresponding to the missions may be displayed side by side on a horizontally long mission board, and may be scrolled horizontally. Moreover, the mission UI image corresponding to a team mission is displayed fixedly in the uppermost of the mission display portion, and the mission UI images regarding the personal missions of a player may be displayed as one set below the same, and by scrolling left and right or up and down, the mission UI images corresponding to personal missions of other players may be displayed as one set.

Moreover, the structure of the game apparatus, various kinds of screens and specific numeral values shown in the embodiment are mere examples, should not be limited and can be appropriately changed according to actual products.

Moreover, if the same or similar result is obtainable, an order of the respective steps shown in the flowcharts may be exchanged.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored therein an information processing program executable by a computer of an information processing apparatus, wherein the information processing program causes one or more processors of the computer to provide execution comprising:

executing game processing in a multi-play and in a solo-play, during a game of the multi-play, regarding an overall mission having a plurality of missions including a personal mission to be set to a player and other missions to be set to other players:

when a progress condition set to any mission included in the overall mission is satisfied based on a play by any player that joins the multi-play, progressing the mission satisfying the progress condition;

granting a reward to the player when the progress degree of the any mission reaches a mission accomplishment condition indicating the mission is accomplished; and ending the multi-play while maintaining a state associated with the progress degree of the personal mission, and during a game of the solo-play:

when the progress condition set to any personal mission is satisfied based on a play by the player, progressing the mission satisfying the progress condition;

granting the reward to the player when the progress degree of the any personal mission reaches the mission accomplishment condition indicating the mission is accomplished; and starting the multi-play based on the overall mission including the personal mission having the progress degree, set to the any personal mission, at a time of starting and the other missions having the progress degree, set to the any mission, at the time of starting.

2. The non-transitory computer-readable storage medium according to claim 1, wherein the information processing program further causes the one or more processors to provide execution comprising:

holding a predetermined number of the personal missions, and during the game of the multi-play game and the game of the solo-play game, completing, when any personal mission reaches the mission accomplishment condition, the any personal mission, and adding a new personal mission.

3. The non-transitory computer-readable storage medium according to claim 2, wherein the information processing program further causes the one or more processors to provide execution comprising:

during the game of the multi-play and the game of the solo-play game, adding a personal bonus mission, as a new personal mission not included in the predetermined number of the personal missions, when an accomplishment situation of the personal mission satisfies a predetermined condition.

4. The non-transitory computer-readable storage medium according to claim 3, wherein the information processing program further causes the one or more processors to provide execution comprising:

setting the condition that the personal bonus mission is added as the personal mission is accomplished a predetermined number of times, counting, after adding the personal bonus mission, the number of accomplishment times of the personal mission having the condition that a next personal mission is to be added regardless of accomplishment of the personal bonus mission; and adding the new personal bonus mission at a time the condition the next personal bonus mission is added is satisfied and the personal bonus mission being held is accomplished.

5. The non-transitory computer-readable storage medium according to claim 3, wherein the information processing program further causes the one or more processors to provide execution comprising:

setting an amount of a reward for each of the missions, and an amount of the reward that is set to the personal bonus mission is greater compared with other personal missions.

6. The non-transitory computer-readable storage medium according to claim 3, wherein the information processing program further causes the one or more processors to provide execution comprising:

during the game of the multi-play, adding an overall mission, not included in the personal missions and the other missions, to the overall bonus mission when the accomplishment situations of the personal bonus missions of all of the player joining to the multi-play satisfy a predetermined condition.

7. The non-transitory computer-readable storage medium according to claim 6, wherein the information processing program further causes the one or more processors to provide execution comprising:

setting an amount of a reward for each of the missions;

setting an amount of a reward set to the personal bonus mission to be greater compared with other personal missions; and setting an amount of a reward set to the overall bonus mission to be greater compared with the personal bonus mission.

8. The non-transitory computer-readable storage medium according to claim 1, wherein the information processing program further causes the one or more processors to provide execution comprising:

during the game of the multi-play and the game of the solo-play game, discarding the personal mission being held based on an update instruction by the player, and adding a new personal mission.

9. The non-transitory computer-readable storage medium according to claim 8, wherein the information processing program further causes the one or more processors to provide execution comprising:

consuming the reward when discarding the personal mission being held based on an update instruction by the player and adding a new personal mission.

10. The non-transitory computer-readable storage medium according to claim 1, wherein during the game of the solo-play, the multi-play is started based on the overall mission while progressing the personal mission by continuing the progress degree set to the any personal mission.

11. A game control method of an information processing apparatus, the method comprising:

executing a game of a multi-play and a game of a solo-plat, and during a game of the multi-play, regarding an overall mission having a plurality of missions including a personal mission to be set to a player and other missions to be set to other players:

in association with a progress condition set to any mission included in the overall mission being satisfied based on a play by any player that joins the multi-play, progressing the mission satisfying the progress condition;

granting a reward to the player in association with a progress degree of the any mission reaching a mission accomplishment condition indicating the mission is accomplished; and ending the multi-play while maintaining a state associated with the progress degree of the personal mission, and during a game of the solo-play:

in association with the progress condition set to any personal mission is satisfied based on a play by the player, progressing the mission satisfying the progress condition;

granting the reward to the player when the progress degree of the any personal mission reaches the mission accomplishment condition indicating the mission is accomplished; and starting the multi-play based on the overall mission including the personal mission having the progress degree, set to the any personal mission, at a time of starting and the other missions having the progress degree, set to the any mission, at the time of starting.

12. The game control method according to claim 11, further comprising:

holding a predetermined number of the personal missions, and during the game of the multi-play game and the game of the solo-play game, completing, in association with any personal mission reaching the mission accomplishment condition, the any personal mission, and adding a new personal mission.

13. The game control method according to claim 12, further comprising:

during the game of the multi-play and the game of the solo-play game, adding a personal bonus mission, as a new personal mission not included in the predetermined number of the personal missions, in association with an accomplishment situation of the personal mission satisfying a predetermined condition.

14. The game control method according to claim 13, further comprising:

setting the condition that the personal bonus mission is added as that the personal mission is accomplished a predetermined number of times, counting, after adding the personal bonus mission, the number of accomplishment times of the personal mission that is the condition a next personal mission is to be added regardless of accomplishment of the personal bonus mission; and adding the new personal bonus mission at a time that the condition the next personal bonus mission is added is satisfied and the personal bonus mission being held is accomplished.

15. The game control method according to claim 13, further comprising:

setting an amount of a reward for each of the missions, and an amount of the reward that is set to the personal bonus mission is greater compared with other personal missions.

16. The game control method according to claim 13, further comprising:

during the game of the multi-play, adding an overall bonus mission, not included in the personal missions and the other missions, to the overall mission in association with the accomplishment situations of the personal bonus missions of all of the player joining to the multi-play satisfying a predetermined condition.

17. The game control method according to claim 16, further comprising:

setting an amount of a reward for each of the missions;

setting an amount of a reward set to the personal bonus mission to be greater compared with other personal missions; and setting an amount of a reward set to the overall bonus mission to be greater compared with the personal bonus mission.

18. The game control method according to claim 11, further comprising:

during the game of the multi-play and the game of the solo-play game, discarding the personal mission being held based on an update instruction by the player, and adding a new personal mission.

19. The game control according to claim 18, further comprising:

consuming the reward in association with discarding the personal mission being held based on an update instruction by the player and adding a new personal mission.

20. A game system including a plurality of information processing apparatuses, at least one information processing apparatus, of the plurality of information processing apparatuses, comprising:

a processor; and a memory configured to store computer readable instructions that, when executed by the processor, causes the at least one information processing apparatus to:

execute game processing in a multi-play and in a solo-play, during a game of the multi-play, regarding an overall mission having a plurality of missions including a personal mission to be set to a player and other missions to be set to other players:

when a progress condition set to any mission included in the overall mission is satisfied based on a play by any player that joins the multi-play, progress the mission satisfying the progress condition;

grant a reward to the player when the progress degree of the any mission reaches a mission accomplishment condition indicating the mission is accomplished; and end the multi-play while maintaining a state associated with the progress degree of the personal mission, and during a game of the solo-play:

when the progress condition set to any personal mission is satisfied based on a play by the player, progress the mission satisfying the progress condition;

grant the reward to the player when the progress degree of the any personal mission reaches the mission accomplishment condition indicating the mission is accomplished; and start the multi-play based on the overall mission including the personal mission having the progress degree, set to the any personal mission, at a time of starting and the other missions having the progress degree, set to the any mission, at the time of starting.

* * * * *